US011586198B2

(12) United States Patent
Mukaida et al.

(10) Patent No.: US 11,586,198 B2
(45) Date of Patent: Feb. 21, 2023

(54) CHARGING SYSTEM FOR AUTONOMOUS UNDERWATER VEHICLE AND METHOD OF LIFTING AND RECOVERING AUTONOMOUS UNDERWATER VEHICLE

(71) Applicant: KAWASAKI JUKOGYO KABUSHIKI KAISHA, Kobe (JP)

(72) Inventors: Minehiko Mukaida, Kobe (JP); Noriyuki Okaya, Kobe (JP); Manabu Matsui, Nishinomiya (JP); Toshiya Hayashi, Kobe (JP); Kosuke Masuda, Kobe (JP); Seiji Kashiwagi, Kobe (JP); Takashi Okada, Akashi (JP); Fumitaka Tachinami, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 328 days.

(21) Appl. No.: 16/644,419

(22) PCT Filed: Sep. 3, 2018

(86) PCT No.: PCT/JP2018/032640
§ 371 (c)(1),
(2) Date: Mar. 4, 2020

(87) PCT Pub. No.: WO2019/045103
PCT Pub. Date: Mar. 7, 2019

(65) Prior Publication Data
US 2021/0072746 A1    Mar. 11, 2021

(30) Foreign Application Priority Data
Sep. 4, 2017   (JP) .............................. JP2017-169724

(51) Int. Cl.
*G05D 1/00* (2006.01)
*G05D 1/10* (2006.01)
*B63G 8/00* (2006.01)

(52) U.S. Cl.
CPC ........... *G05D 1/0022* (2013.01); *B63G 8/001* (2013.01); *G05D 1/10* (2013.01); *B63G 2008/005* (2013.01)

(58) Field of Classification Search
CPC ........ G05D 1/0022; G05D 1/10; B63G 8/001; B63G 2008/005
See application file for complete search history.

(56) References Cited

U.S. PATENT DOCUMENTS

2006/0054074 A1    3/2006  Wingett et al.
2016/0009344 A1*   1/2016  Jourdan ................... B63G 8/18
                                                    114/321

(Continued)

FOREIGN PATENT DOCUMENTS

EP      3 360 775 A1    8/2018
JP      H07-223589 A    8/1995

(Continued)

OTHER PUBLICATIONS

Design_and_test_of_a_robust_docking_system_for_hovering_AUVs (Year: 2012).*

(Continued)

*Primary Examiner* — Anne Marie Antonucci
*Assistant Examiner* — Jingli Wang
(74) *Attorney, Agent, or Firm* — Oliff PLC

(57) ABSTRACT

A charging system includes a charging station having: a base underwater; a pole extending in an upper-lower direction; and a power supplying portion. An AUV includes: an underwater main body; a power receiving portion; a holding device including a pair of guide and holding portions, the (Continued)

pair of guide portions guides the pole to a holding position after the pole contacts the guide portions from a proceeding-direction, the holding portion holds the pole to be rotatable relative to the pole; a thrust generating apparatus generates in a horizontal direction; and a control device controls the thrust generating apparatus. A light emitter at one of the base and the underwater main body, and a light receiver is provided at the other. The control device controls the thrust so the underwater main body reaches a rotational position where the light receiver receives light emitted, the rotational position set relative to the pole.

12 Claims, 15 Drawing Sheets

(56) References Cited

U.S. PATENT DOCUMENTS

| | | | |
|---|---|---|---|
| 2016/0176487 A1* | 6/2016 | Stone | B63G 8/001 |
| | | | 114/179 |
| 2018/0297677 A1 | 10/2018 | Sakaue et al. | |
| 2018/0319473 A1* | 11/2018 | Sakaue | B63C 11/48 |

FOREIGN PATENT DOCUMENTS

| | | | | |
|---|---|---|---|---|
| JP | H07223589 | * | 8/1995 | ............ B63G 8/001 |
| JP | H08-282588 A | | 10/1996 | |
| JP | H08282588 | * | 10/1996 | ............ B63B 27/36 |
| JP | 3044217 B1 | | 5/2000 | |
| JP | 2000-272583 A | | 10/2000 | |
| JP | 2000272583 | * | 10/2000 | ............ B63G 8/001 |
| JP | 2016-515060 A | | 5/2016 | |
| JP | 2017-071265 A | | 4/2017 | |
| JP | 2017-071266 A | | 4/2017 | |
| WO | 2017/061427 A1 | | 4/2017 | |

OTHER PUBLICATIONS

Singh, Hanumant et al., "Docking for anAutonomous Ocean Sampling Network", IEEE Journal of Oceanic Engineering, Oct. 2001,vol. 26, No. 4, pp. 498-514, ISSN:0364-9059 (Year: 2001).*
JP2000272583A machine translation (Year: 2000).*
JPH08282588A—Machine translation (Year: 1996).*
D8 JPH7223589 macnine translation (Year: 1995).*
Wirtz et al., "Design and Test of a Robust Docking System for Hovering AUVs," OCEANS, 2012, pp. 1-6.
Singh et al., "Docking for an Autonomous Ocean Sampling Network," IEEE Journal of Oceanic Engineering, Oct. 2001, vol. 26, No. 4, pp. 498-514.

* cited by examiner

CHARGING SYSTEM FOR AUTONOMOUS UNDERWATER VEHICLE AND METHOD OF LIFTING AND RECOVERING AUTONOMOUS UNDERWATER VEHICLE

TECHNICAL FIELD

The present invention relates to a charging system for an autonomous underwater vehicle and a method of lifting and recovering the autonomous underwater vehicle.

BACKGROUND ART

An autonomous underwater vehicle (hereinafter may be referred to as an "AUV") sails under water for seabed work, seabed investigation, and the like by a built-in power source without requiring electric power supply from a mother ship. Charging systems capable of charging AUVs under water without lifting and recovering the AUVs to mother ships have been developed. According to such charging systems, the AUV approaches and is coupled to a charging station prepared under water and is charged. It is desirable that according to the charging system, the AUV can approach and be coupled to the charging station from any 360° direction in a stable posture even under the influence of tidal current or the like.

In recent years, a charging system configured such that an AUV can approach and be coupled to a charging station from any 360° direction has been proposed (see PTL 1, for example). Such charging system includes: a charging station suspended under water by a string-shaped body from a ship on the sea; and an AUV coupled to the charging station under water so as to be rotatable about the string-shaped body. The charging station includes a noncontact electricity supplying portion. When the ship on the sea tows the charging station, the charging station takes such a posture that the noncontact electricity supplying portion is located downstream of the string-shaped body in a water flow direction. On the other hand, the AUV includes a noncontact electricity receiving portion. When the charging station to which the AUV is coupled is towed, the AUV receives water flow to rotate about the string-shaped body and therefore takes such a posture that the noncontact electricity receiving portion is located downstream of the string-shaped body in the water flow direction. Thus, the direction of the charging station and the direction of the AUV are made to coincide with each other, and the noncontact electricity receiving portion of the AUV and the noncontact electricity supplying portion of the charging station are positioned such that electric power supply is realized.

CITATION LIST

Patent Literature

PTL 1: Japanese Laid-Open Patent Application Publication No. 2017-71265

SUMMARY OF INVENTION

Technical Problem

However, according to the above-described charging system, to position the noncontact electricity receiving portion of the AUV and the noncontact electricity supplying portion of the charging station such that electric power supply is realized, the charging station and the AUV which are being coupled to each other need to receive water flow. To be specific, to position the charging station and the AUV at a place where there is no water flow, such as tidal current, the charging station and the AUV which are being coupled to each other need to be towed by the ship on the sea. Therefore, a charging system capable of more easily positioning a charging station and an AUV for electric power supply is desired.

An object of the present invention is to provide a charging system for an AUV and a method of lifting and recovering the AUV, by each of which an AUV can approach a charging station from any 360° direction, and positioning between the charging station and the AUV for charging the AUV can be easily performed.

Solution to Problem

To solve the above problems, a charging system for an AUV according to the present invention includes: a charging station including a base located under water, a pole provided at the base and extending in an upper-lower direction, and a power supplying portion provided at a position that is located at the base and is away from the pole in a horizontal direction; and an AUV including an underwater vehicle main body, a power receiving portion provided at the underwater vehicle main body and supplied with electric power from the power supplying portion, a holding device including a pair of guide portions and a holding portion, the pair of guide portions being configured such that an interval between the guide portions widens in a proceeding direction from the underwater vehicle main body, and the guide portions guide the pole to a holding position after the pole contacts the guide portions from a proceeding-direction side, the holding portion being configured to hold the pole at the holding position so as to be rotatable relative to the pole, a thrust generating apparatus configured to generate, in at least the horizontal direction, thrust which makes the underwater vehicle main body rotate about the pole with the holding device holding the pole, and a control device configured to control the thrust generating apparatus. One of a light emitter and a light receiver is provided at a position that is located at the base and is away from the pole in the horizontal direction. The other of the light emitter and the light receiver is provided at a position that is located at the underwater vehicle main body and is away from the holding position in the horizontal direction. The control device controls the thrust generating apparatus such that with the holding device holding the pole, the underwater vehicle main body reaches a rotational position where the light receiver receives light emitted from the light emitter, the rotational position being set relative to the pole.

According to the above configuration, even when the AUV enters the charging station while being displaced from the charging station to some extent, the pole contacts the guide portion of the holding device from the proceeding-direction side of the underwater vehicle main body, and the contacted guide portion of the holding device guides the pole to the holding position. Then, the holding portion of the holding device holds the pole so as to be rotatable relative to the pole. Therefore, the AUV can approach the charging station from any 360° direction. Further, by using a simple determination method that is whether or not the light receiver receives the light emitted from the light emitter, the control device can control the thrust generating apparatus to perform positioning between the power receiving portion and the power supplying portion. Therefore, the positioning between the charging station and the AUV for charging the AUV can be easily performed.

In the charging system for the AUV, the light emitter may be an underwater vehicle-side optical transmitter configured to emit the light as an optical signal. The light receiver may be a station-side optical receiver configured to receive the optical signal from the underwater vehicle-side optical transmitter. The charging station may include a station-side optical transmitter configured to emit light as an optical signal. The AUV may include an underwater vehicle-side optical receiver configured to receive the optical signal from the station-side optical transmitter. The AUV may control the thrust generating apparatus based on the optical signal that is transmitted from the station-side optical transmitter to the underwater vehicle-side optical receiver and indicates a communication state between the underwater vehicle-side optical transmitter and the station-side optical receiver. According to this configuration, the positioning between the power receiving portion and the power supplying portion can be performed by utilizing the optical transmitters and the optical receivers for mutual optical communication between the charging station and the AUV.

In the charging system for the AUV, the thrust generating apparatus may generate the thrust which makes the underwater vehicle main body move in the proceeding direction and the upper-lower direction. The station-side optical transmitter may be provided so as to emit the light radially about the pole as the optical signal. The AUV may include a direction detector configured to detect a coming direction of the light emitted from the station-side optical transmitter. The control device may control the thrust generating apparatus based on the coming direction detected by the direction detector such that the AUV proceeds, and the guide portions contact the pole. According to this configuration, the station-side optical transmitter is provided so as to emit the light radially about the pole as the optical signal. Therefore, by making the AUV proceed toward the light emitted from the station-side optical transmitter, the AUV can be made to approach the pole with a high degree of accuracy.

The charging system for the AUV may further include a water floating body floating on water. The charging station may be suspended under water by a cord extending from the water floating body. The pole may extend downward from the base. According to this configuration, the pole extends downward from the base, and the cord extends from the base side to above water in a direction opposite to the pole. Therefore, the cord and the base can be easily coupled to each other so as not to interfere with the AUV that approaches the pole.

In the charging system for the AUV, one of the AUV and the charging station may include a locking device. The other of the AUV and the charging station may include a locked portion locked by the locking device. In a state where the locking device locks the locked portion, and with this, the power receiving portion is arranged at such a position as to be supplied with electric power from the power supplying portion, the AUV may dock with the charging station. According to this configuration, the locking device locks the locked portion provided at the underwater vehicle main body, and with this, the underwater vehicle main body can be fixed to the charging station.

In the charging system for the AUV, the thrust generating apparatus may generate the thrust which makes the underwater vehicle main body move along the pole with the holding device holding the pole. When the underwater vehicle main body located at the rotational position moves along the pole such that the power supplying portion and the power receiving portion approach each other, the locked portion may reach such a locking position as to be locked by the locking device. According to this configuration, the locking device locks the locked pin provided at the underwater vehicle main body, and with this, the position of the underwater vehicle main body can be fixed to the rotational position where the light receiver receives the light emitted from the light emitter. Therefore, even when the underwater vehicle main body receives water flow due to the influence of tidal current or the like, the underwater vehicle main body can be made to stay at the target rotational position without driving the thrust generating apparatus.

In the charging system for the AUV, the locked portion may be a locked pin extending upward or downward from the underwater vehicle main body. The charging station may include the locking device. The locking device may include a guide surface which is contacted by the locked pin and guides the locked pin to the locking position when the underwater vehicle main body moves along the pole such that the power supplying portion and the power receiving portion approach each other, and a locking portion configured to lock the locked pin guided to the locking position. According to this configuration, even when the AUV moves along the pole with the locked pin displaced relative to the locking position to some extent, the guide surface absorbs such displacement and guides the locked pin to the locking position. Therefore, the locked pin of the AUV can be guided to the locking position with a high degree of accuracy.

In the charging system for the AUV, the charging station may include a rotation restricting portion configured to, when the underwater vehicle main body is in the middle of moving along the pole, contact the underwater vehicle main body or the guide portion to mechanically restrict a rotation range of the underwater vehicle main body relative to the pole. According to this configuration, even when the underwater vehicle main body receives water flow such as tidal current while moving along the pole, the rotation range of the underwater vehicle main body relative to the pole is mechanically restricted by the rotation restricting portion. This can reduce the load of the thrust generating apparatus that makes the underwater vehicle main body stay at the target rotational position.

In the configuration in which the AUV docks with the above charging station, the charging system for the AUV may further include a water floating body floating on water. The charging station may be suspended under water by a cord extending from the water floating body. The pole may extend downward from the base. The water floating body may include a load lifting facility configured to pull the cord to lift up in the air the charging station with which the AUV has docked. According to this configuration, the AUV which has docked with the charging station can be lifted and recovered to the water floating body from the underwater and can be launched from the water floating body to the underwater. Further, since the pole extends downward from the base, the AUV is arranged under the charging station and docks with the charging station. Therefore, the degree of freedom of the design of a portion where the base and the cord are coupled to each other improves. On this account, the coupling between the base and the cord can be easily performed such that, for example, when the charging station with which the AUV has docked is lifted up in the air, unnecessary stress does not act on respective portions of the charging station.

In the charging system for the AUV, the charging station may include a thrust generating apparatus configured to maintain at least one of a posture of the charging station under water and a direction of the charging station under water. According to this configuration, at least one of the posture and direction of the charging station under water can be controlled by the thrust generating apparatus.

A method of lifting and recovering an AUV according to the present invention includes: suspending a station under water from a water floating body floating on water, the station being configured to dock with an AUV; making the AUV approach and dock with the station under water; and pulling up the station with which the AUV has docked and lifting and recovering the station to the water floating body.

In the method of lifting and recovering the AUV, in the step of making the AUV dock with the station under water, the AUV may dock with the station from under the station. In the step of pulling up the station with which the AUV has docked, the station with which the AUV has docked may be lifted up in the air while maintaining the posture of the station with which the AUV has docked under water.

Advantageous Effects of Invention

The present invention can provide the charging system for the AUV, the charging system being configured such that the AUV can approach the charging station from any 360° direction, and the positioning between the charging station and the AUV for charging the AUV can be easily performed.

DESCRIPTION OF EMBODIMENTS

Embodiment 1

Hereinafter, Embodiment 1 of the present invention will be described with reference to the drawings.

Figure 1:
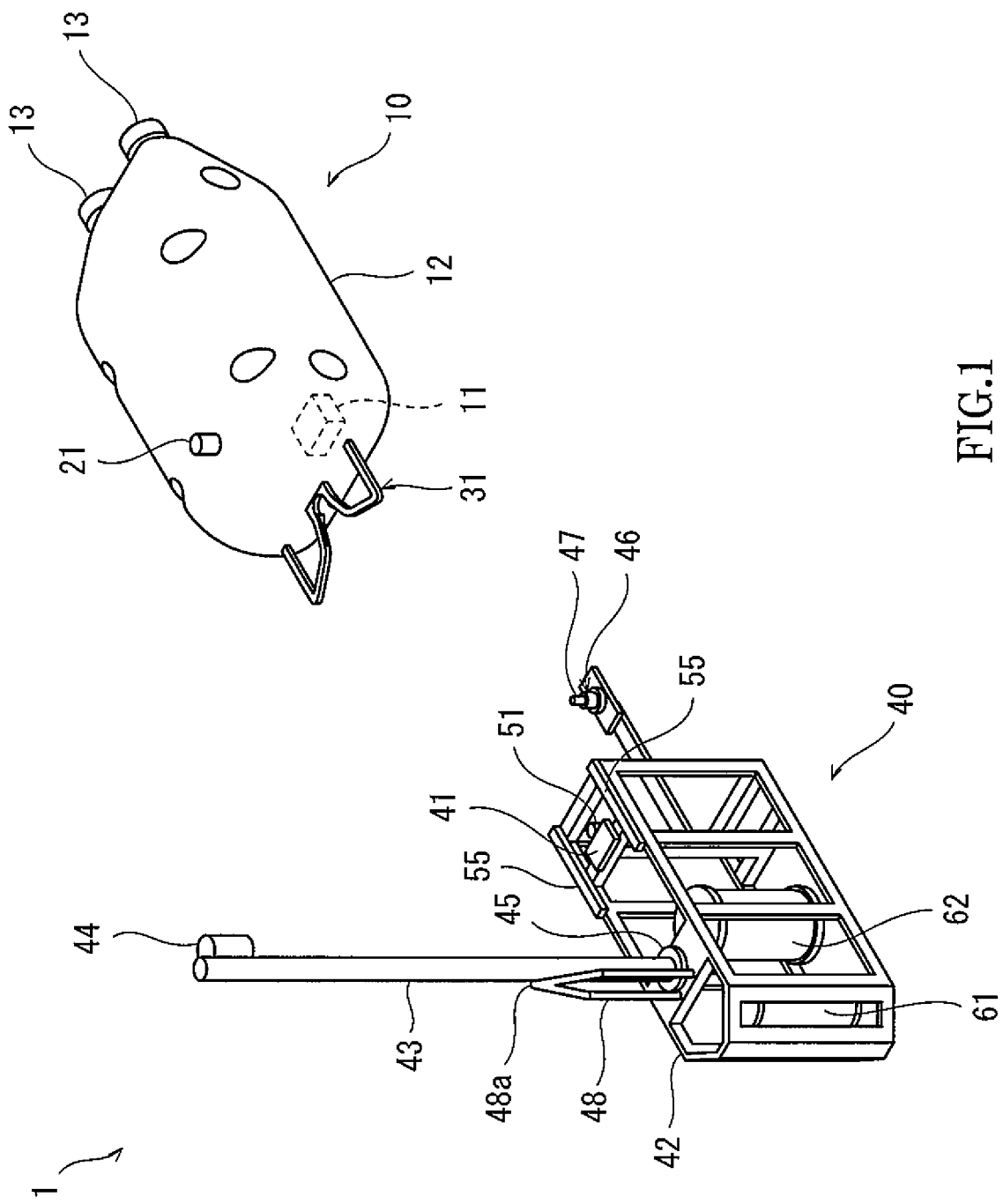
FIG. 1 is a diagram showing the schematic configuration of a charging system for an AUV according to Embodiment 1 of the present invention.

FIG. 1 is a diagram showing the schematic configuration of a charging system 1 according to Embodiment 1. The charging system 1 charges an AUV 10 under water. The charging system 1 includes the AUV 10 and a charging station 40. The AUV 10 includes a power receiving portion 11, and the charging station 40 includes a power supplying portion 41. According to the charging system 1, the AUV 10 that sails under water approaches and docks with the charging station 40.

Figure 2:
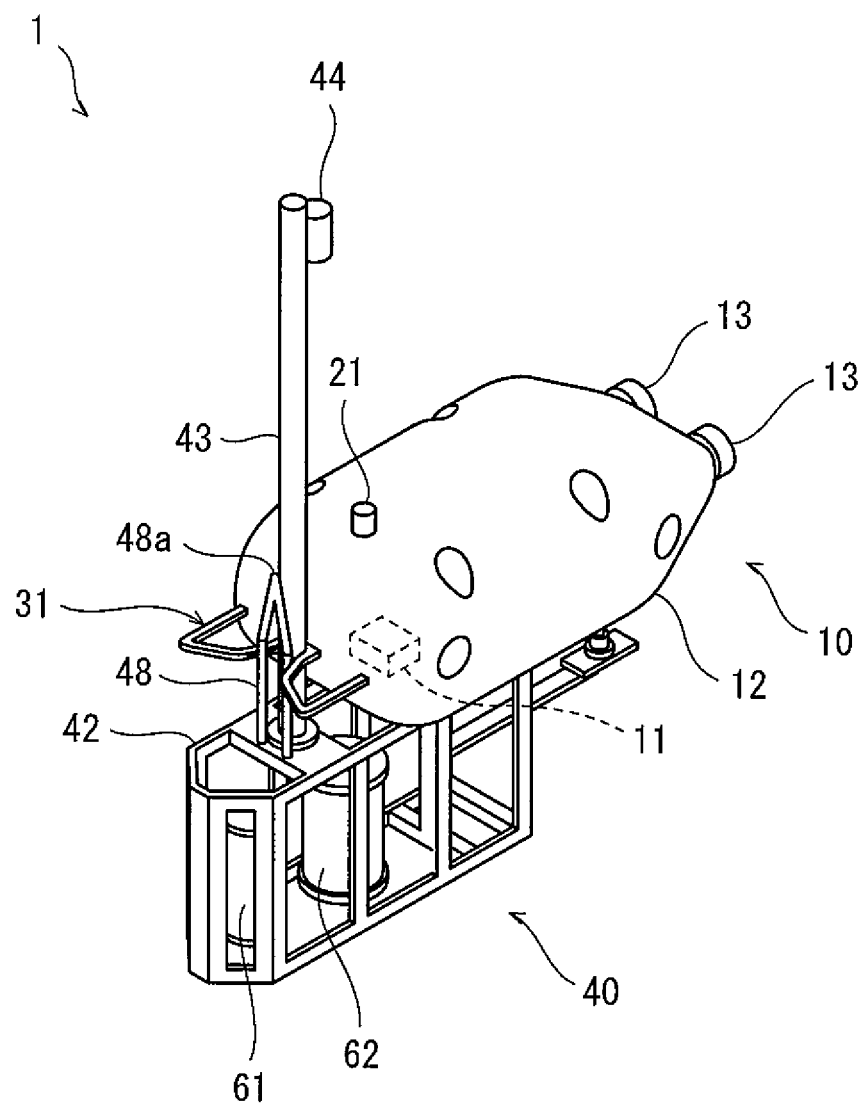
FIG. 2 is a diagram showing that the AUV has docked with a charging station shown in FIG. 1.

FIG. 2 shows that the AUV 10 has docked with the charging station 40. When the AUV 10 docks with the charging station 40, the power receiving portion 11 of the AUV 10 is arranged at such a position as to be supplied with electric power from the power supplying portion 41 (see FIG. 1) of the charging station 40. Hereinafter, the configurations of the AUV 10 and the charging station 40 will be described.

Configuration of AUV

Figure 3:
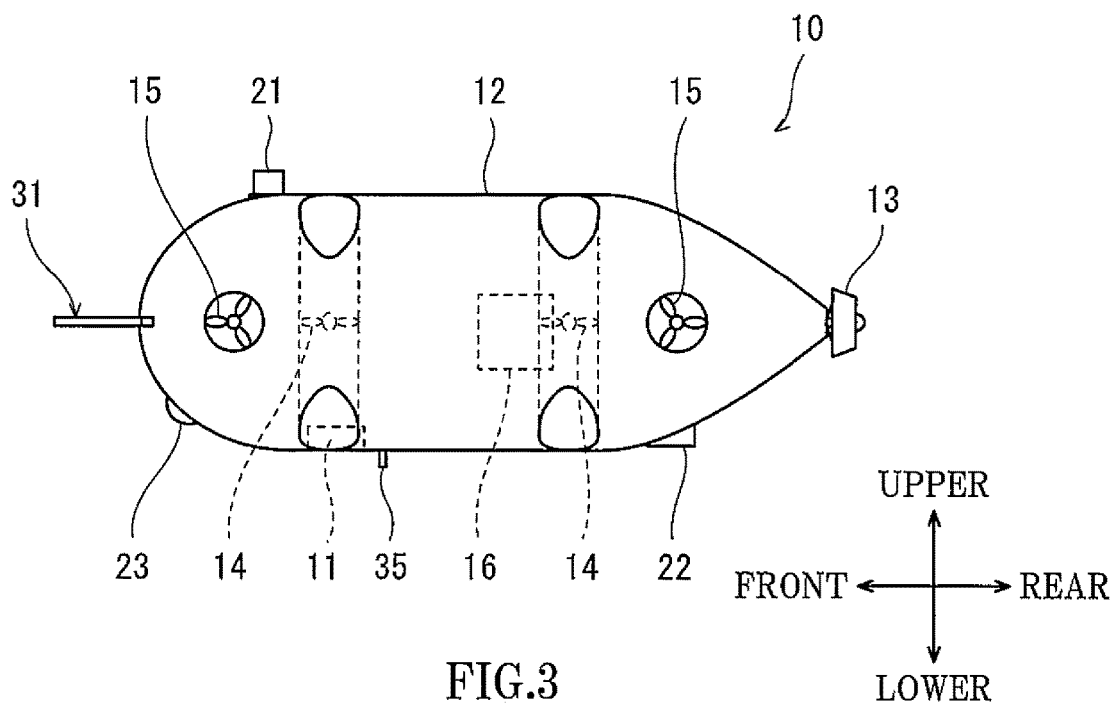
FIG. 3 is a side view of the AUV shown in FIG. 1.
Figure 4:
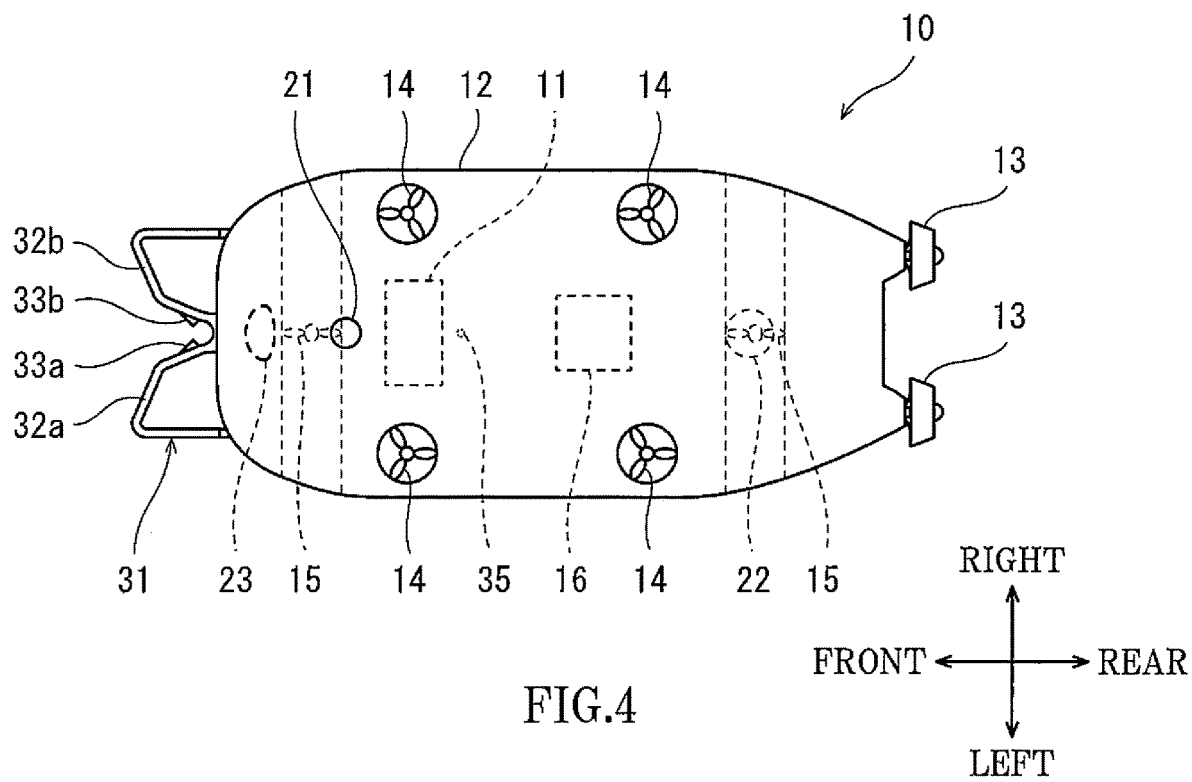
FIG. 4 is a plan view of the AUV shown in FIG. 1.

First, the configuration of the AUV 10 will be described. FIG. 3 is a side view of the AUV 10, and FIG. 4 is a plan view of the AUV 10. In the present description, for convenience of explanation, a proceeding direction of the AUV 10 when the AUV 10 approaches the charging station 40 is defined as a front direction, and a direction opposite to the proceeding direction is defined as a rear direction. Left, right, upper, and lower directions based on the proceeding direction are defined as left, right, upper, and lower directions, respectively.

The AUV 10 includes an underwater vehicle main body 12 in which a storage battery is incorporated as a power source. A front portion of the underwater vehicle main body 12 has a streamline shape that is low in water resistance. As shown in FIG. 3, the above-described power receiving portion 11 is provided at a lower portion of the underwater vehicle main body 12. The power receiving portion 11 is a noncontact power receiving device that is supplied with electric power from the power supplying portion 41 of the charging station 40 in a noncontact manner. When the AUV 10 has docked with the charging station 40, the power receiving portion 11 is arranged at a position opposed to the power supplying portion 41 so as to be supplied with electric power from the power supplying portion 41 in a noncontact manner.

A thrust generating apparatus is provided at the underwater vehicle main body 12. The thrust generating apparatus generates thrust that moves the underwater vehicle main body 12 under water. The thrust generating apparatus includes two main propulsion units 13, four vertical thrusters 14, and two horizontal thrusters 15. The two main propulsion units 13 move the underwater vehicle main body 12 in the front direction. The four vertical thrusters 14 move the underwater vehicle main body 12 in an upper-lower direction. The two horizontal thrusters 15 move the underwater vehicle main body 12 in a left-right direction.

A control device 16 is provided in the underwater vehicle main body 12. The control device 16 controls the main propulsion units 13, the vertical thrusters 14, and the horizontal thrusters 15. The control device 16 includes a storage portion and a calculating portion. The storage portion stores various programs, and the calculating portion executes the programs stored in the storage portion. When the calculating portion executes a predetermined program stored in the storage portion in the control device 16, the AUV 10 autonomously sails under water or docks with the charging station 40.

An acoustic positioning device 21 is provided at an upper portion of the underwater vehicle main body 12. The acoustic positioning device 21 and a below-described transponder 44 of the charging station 40 constitute an acoustic positioning system configured to specify a distance from the AUV 10 to the charging station 40 and a direction of the charging station 40 relative to the AUV 10. The acoustic positioning system is, for example, an USBL (Ultra Short Base Line) positioning system or a SSBL (Super Short Base Line) positioning system in which the acoustic positioning device 21 calculates a distance to the transponder 44 from a go-return time of sound waves between the acoustic positioning device 21 and the transponder 44 and calculates a direction of the transponder 44 based on a phase difference of the sound waves that have reached elements of a wave receiving array included in the acoustic positioning device 21. It should be noted that the acoustic positioning system does not have to be the above system and may be, for example, a SBL (Short Base Line) positioning system.

An underwater vehicle-side optical transmitter 22 (corresponding to a "light emitter" of the present invention) configured to transmit an optical signal downward is provided at a rear-lower portion of the underwater vehicle main body 12. An underwater vehicle-side optical receiver 23 configured to receive optical signals coming from the front side and lower side of the AUV 10 is provided at a front-lower portion of the underwater vehicle main body 12.

In the present embodiment, the underwater vehicle-side optical receiver 23 also serves as a direction detector configured to detect a coming direction of light emitted from the charging station 40 (more specifically, a below-described station-side optical transmitter 45). Specifically, the underwater vehicle-side optical receiver 23 includes a light receiving array (not shown) as a light receiving portion, and the light receiving array includes a plurality of light receiving elements that are independent from each other. The underwater vehicle-side optical receiver 23 detects the coming direction of the light emitted from the charging station 40 by comparing received light intensities of the light receiving elements of the light receiving array. As described below, the control device 16 utilizes the coming direction acquired by the underwater vehicle-side optical receiver 23 in order to make the AUV 10 approach the charging station 40.

A holding device 31 is provided at a front end portion of the underwater vehicle main body 12. When the AUV 10 docks with the charging station 40, the holding device 31 contacts and holds a below-described pole 43 of the charging station 40. Further, as shown in FIG. 3, a locked pin 35 (corresponding to a "locked portion" of the present invention) extending downward is provided at the lower portion of the underwater vehicle main body 12. The locked pin 35 is locked by a below-described locking device 51 of the charging station 40. Details of the holding of the pole 43 by the holding device 31 and the locking of the locked pin 35 by the locking device 51 will be described later.

Configuration of Charging Station

Figure 5:
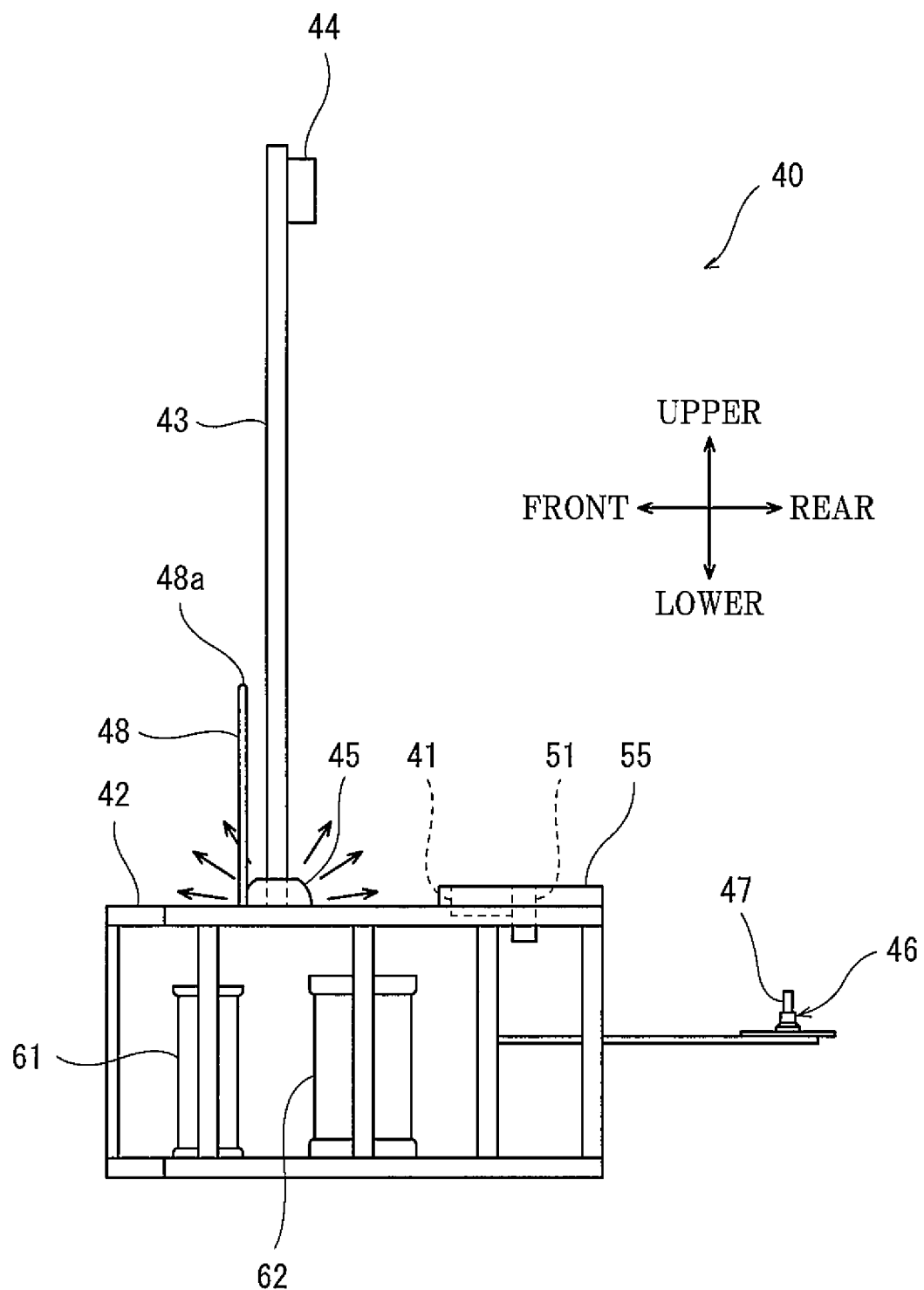
FIG. 5 is a side view of the charging station shown in FIG. 1.
Figure 6:
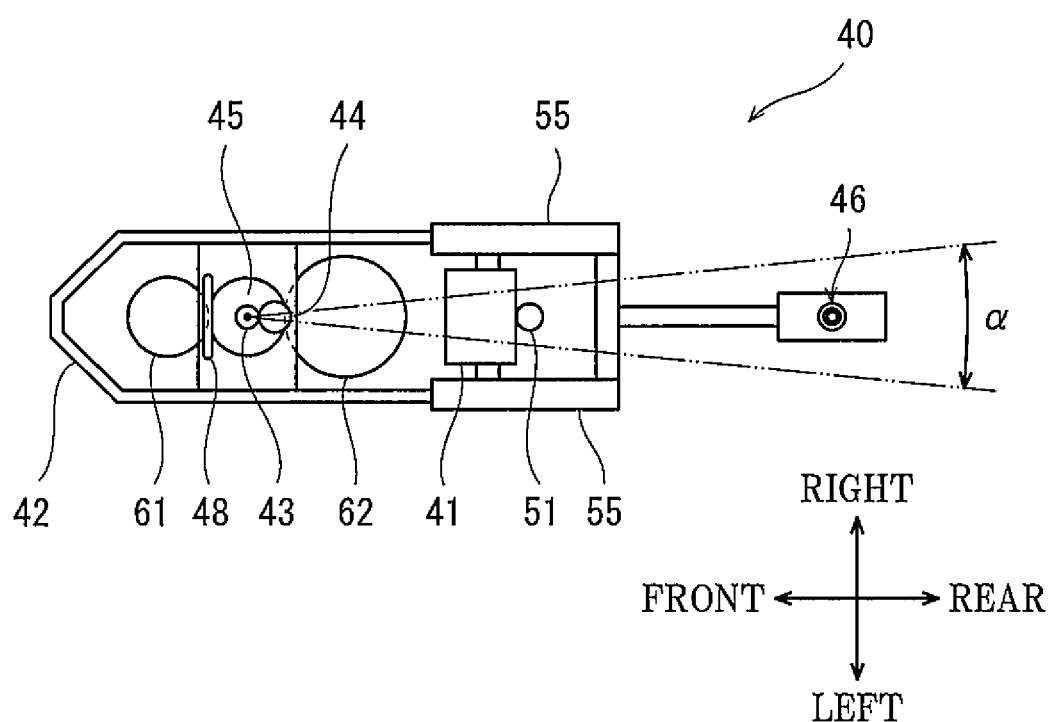
FIG. 6 is a plan view of the charging station shown in FIG. 1.
Figure 7:
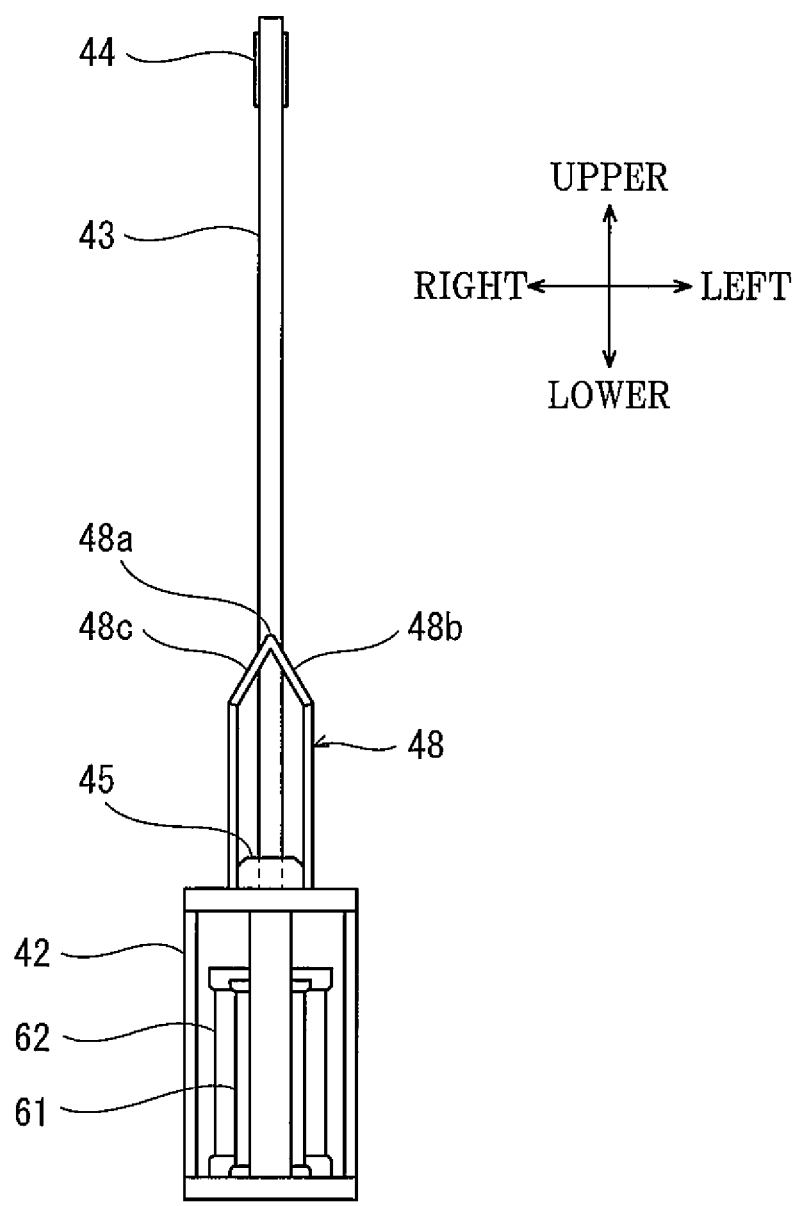
FIG. 7 is a front view of the charging station shown in FIG. 1.

Next, the configuration of the charging station 40 will be described. FIG. 5 is a side view of the charging station 40. FIG. 6 is a plan view of the charging station 40. FIG. 7 is a front view of the charging station 40. In the present description, for convenience of explanation, front, rear, left, right, upper, and lower sides of the AUV 10 of FIG. 2 that has docked with the charging station 40 are defined as front, rear, left, right, upper, and lower sides of the charging station 40, respectively.

The charging station 40 includes a base 42 located under water. In the present embodiment, the charging station 40 is of a bottom-of-water installation type, and the base 42 is fixed to the bottom of water. The base 42 is configured by coupling a plurality of frame members, plate members, and the like made of metal.

The pole 43 extending upward is provided at an upper portion of the base 42. When docking with the charging station 40, the AUV 10 approaches the charging station 40 and first contacts the pole 43. In other words, when docking with the charging station 40, the AUV 10 moves toward the charging station 40 such that the holding device 31 contacts the pole 43.

Figure 8:
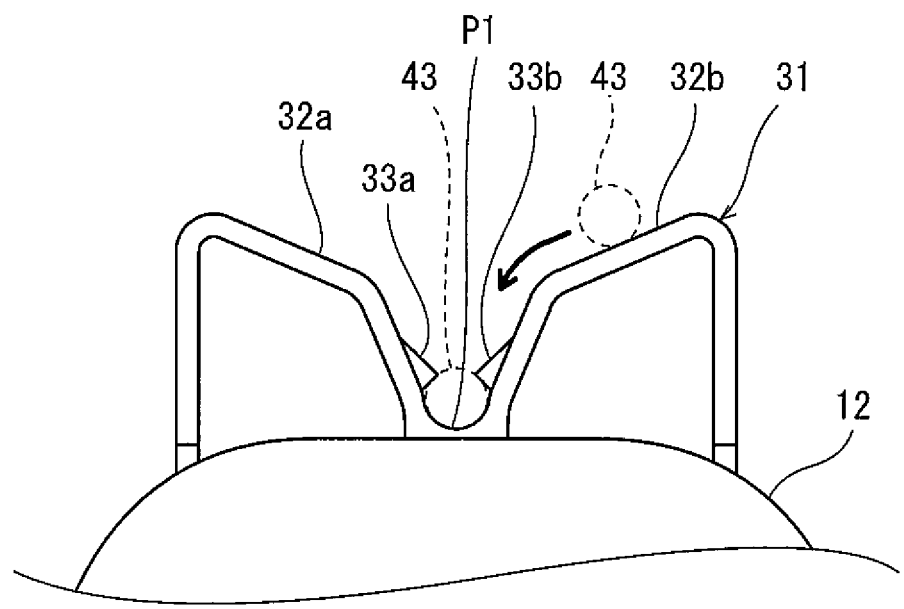
FIG. 8 is an enlarged plan view of a holding device of the AUV shown in FIG. 1.

FIG. 8 shows that the holding device 31 of the AUV 10 holds the pole 43 of the charging station 40. The holding device 31 holds the pole 43 so as to be rotatable relative to the pole 43. A holding position P1 where the pole 43 is held is predetermined at the holding device 31. In FIG. 8, a section of the pole 43 that is in the middle of being introduced to the holding position P1 and a section of the pole 43 that has been introduced to the holding position P1 are shown by broken lines.

The holding device 31 includes a pair of guide portions 32a and 32b and a pair of holding claws 33a and 33b (corresponding to a "holding portion" of the present invention). The pole 43 contacts the guide portions 32a and 32b from the proceeding-direction side of the AUV 10, and the guide portions 32a and 32b guide the pole 43 to the holding position P1. Then, the pair of holding claws 33a and 33b hold the pole 43 so as to be rotatable relative to the pole 43.

An interval between the pair of guide portions 32a and 32b gradually widens in the proceeding direction from the underwater vehicle main body 12 (i.e., from the rear side to the front side). Therefore, when the AUV 10 moves forward in the proceeding direction with the pole 43 contacting one of the pair of guide portions 32a and 32b, the pole 43 pushes the contacted guide portion 32a or 32b and moves to the holding position P1 along the contacted guide portion 32a or 32b while the direction of the underwater vehicle main body 12 is being changed.

The pair of holding claws 33a and 33b are provided at the pair of guide portions 32a and 32b, respectively. The pair of holding claws 33a and 33b press the pole 43 from the front side of the AUV 10 at the holding position P1 to prevent the pole 43 from coming off from the holding position P1.

The holding claws 33a and 33b are configured to be able to project from the respective guide portions 32a and 32b toward a left-right direction middle side of the underwater vehicle main body 12. Specifically, the holding claw 33a moves between a projecting position at which the holding claw 33a projects from the guide portion 32a and a retracting position at which the holding claw 33a retracts in the guide portion 32a, and the holding claw 33b moves between a projecting position at which the holding claw 33b projects from the guide portion 32b and a retracting position at which the holding claw 33b retracts in the guide portion 32b. When the holding claws 33a and 33b are located at the projecting positions, the holding claws 33a and 33b hold the pole 43 at the holding position P1. When the holding claws 33a and 33b are located at the retracting positions, the holding claws 33a and 33b release the holding state of the pole 43 at the holding position P1.

In the present embodiment, the holding claws 33a and 33b are being biased toward the projecting positions. When the holding claws 33a and 33b are pushed by the pole 43 that is moving toward the holding position P1, the holding claws 33a and 33b move toward the retracting positions. When the pole 43 reaches the holding position P1, the holding claws 33a and 33b return to the projecting positions. The holding device 31 includes an actuator (not shown) configured to move the holding claws 33a and 33b from the projecting positions to the retracting positions by a control signal transmitted from the control device 16. When the AUV 10 separates from the charging station 40, the control device 16 drives the actuator to move the holding claws 33a and 33b from the projecting positions to the retracting positions.

The holding device 31 holds the pole 43 so as to be rotatable relative to the pole 43. Therefore, when the horizontal thrusters 15 are driven with the holding device 31 holding the pole 43, the underwater vehicle main body 12 rotates about the pole 43.

As shown in FIGS. 5 to 7, the transponder 44 is provided at an upper end portion of the pole 43. The transponder 44 receives the sound waves transmitted from the above-described acoustic positioning device 21 and sends the sound waves back to the acoustic positioning device 21. The transponder 44 and the above-described acoustic positioning device 21 constitute the acoustic positioning system configured to measure the position of the AUV 10 relative to the charging station 40.

The above-described power supplying portion 41 is provided at the base 42 so as to be located at a position away from the pole 43 in a horizontal direction. Specifically, the power supplying portion 41 is provided at a position that is located at an upper portion of the base 42 and is away from the pole 43 in the rear direction. A distance from the holding position P1 to the power receiving portion 11 in the front-rear direction of the AUV 10 and a distance from the pole 43 to the power supplying portion 41 in the front-rear direction of the charging station 40 are substantially equal to each other. Therefore, when the AUV 10 has docked with the charging station 40, the power receiving portion 11 and the power supplying portion 41 are opposed to each other in the upper-lower direction.

The station-side optical transmitter 45 is provided at the base 42. The station-side optical transmitter 45 is arranged at the upper portion of the base 42 so as to be located around a lower end portion of the pole 43. In the present embodiment, as shown by arrows in FIG. 5, the station-side optical transmitter 45 emits light radially from the lower end portion of the pole 43 to a region at an upper side of the lower end portion of the pole 43. Therefore, even when the AUV 10 approaches the charging station 40 from any 360° direction, the underwater vehicle-side optical receiver 23 can receive the light from the station-side optical transmitter 45.

When the AUV 10 has docked with the charging station 40, the underwater vehicle-side optical receiver 23 and the station-side optical transmitter 45 are arranged so as to be opposed to each other. Therefore, even after the AUV 10 has docked with the charging station 40, the station-side optical transmitter 45 can transmit the optical signal to the above-described underwater vehicle-side optical receiver 23.

In the present embodiment, as described above, the light emitted from the station-side optical transmitter 45 is also utilized by the underwater vehicle-side optical receiver 23 serving as the direction detector to make the AUV 10 approach the charging station 40.

A station-side optical receiver 46 (corresponding to a "light receiver" of the present invention) is provided at a position that is located at the base 42 and is away from the pole 43 in the horizontal direction. Specifically, the station-side optical receiver 46 is provided at the base 42 so as to be located at a position lower than the position where the station-side optical transmitter 45 is provided. A distance from the holding position P1 to the underwater vehicle-side optical transmitter 22 in the front-rear direction of the AUV 10 and a distance from the pole 43 to the station-side optical receiver 46 in the front-rear direction of the charging station 40 are substantially equal to each other. When the AUV 10 has docked with the charging station 40, the station-side optical receiver 46 and the underwater vehicle-side optical transmitter 22 are opposed to each other in the upper-lower direction, and the station-side optical receiver 46 can receive the optical signal from the underwater vehicle-side optical transmitter 22.

In the present embodiment, to make the direction of the AUV 10 coincide with the direction of the charging station 40 when the AUV 10 docks with the charging station 40 in the charging system 1, a communication state between the station-side optical receiver 46 and the underwater vehicle-side optical transmitter 22 is utilized. To be specific, when the holding device 31 of the AUV 10 holds the pole 43, and the AUV 10 reaches a predetermined rotational position relative to the pole 43, the station-side optical receiver 46 can receive the optical signal transmitted from the underwater vehicle-side optical transmitter 22. Specifically, as shown in FIG. 6, when the underwater vehicle-side optical transmitter 22 enters into an angular range a about the pole 43 in a plan view of the charging station 40, the station-side optical receiver 46 can receive the light emitted from the underwater vehicle-side optical transmitter 22.

In the present embodiment, the above-described angular range a is adjusted by limiting the direction of the light that can be received by the station-side optical receiver 46. Specifically, a tubular light blocking portion 47 is provided to stand around a light receiving portion included in the station-side optical receiver 46. The light blocking portion 47 blocks light such that light coming from outside a predetermined angular range does not enter the light receiving portion of the station-side optical receiver 46. It should be noted that the angular range a may be adjusted by limiting an angular range of the light emitted from the underwater vehicle-side optical transmitter 22.

A rotation restricting portion 48 is provided at the base 42. The rotation restricting portion 48 mechanically restricts a rotation range of the underwater vehicle main body 12 relative to the pole 43. The rotation restricting portion 48 is located at a side of the pole 43 which side is opposite to a side where the power supplying portion 41 is arranged, i.e., located at the front side of the pole 43, and extends upward. An upper end portion 48a of the rotation restricting portion 48 is located between the upper end portion and lower end portion of the pole 43 in the upper-lower direction. Therefore, when the underwater vehicle main body 12 is in the middle of moving downward along the pole 43, the rotation restricting portion 48 enters between the pair of guide portions 32a and 32b (see FIG. 2), and with this, mechanically restricts the rotation range of the underwater vehicle main body 12 relative to the pole 43.

As shown in FIG. 7, the rotation restricting portion 48 includes a pair of widening portions 48b and 48c. An interval between the pair of widening portions 48b and 48c gradually increases in the left-right direction of the charging station 40 as the pair of widening portions 48b and 48c extend downward from the upper end portion 48a. To be specific, when the underwater vehicle main body 12 is in the middle of moving downward along the pole 43, the rotation restricting portion 48 enters between the pair of guide portions 32a and 32b, and then, widens in such a direction that the pair of guide portions 32a and 32b separate from each other. Therefore, as the underwater vehicle main body 12 moves downward along the pole 43, the rotation range of the underwater vehicle main body 12 relative to the pole 43 gradually narrows.

The locking device 51 is provided at the base 42. The locking device 51 locks the locked pin 35 of the AUV 10 to fix the direction of the AUV 10 relative to the charging station 40. The locking device 51 is provided at a position that is located at the base 42 and is away from the pole 43 in the horizontal direction. Specifically, as shown in FIGS. 5 and 6, the locking device 51 is provided at a position that is located at the upper portion of the base 42 and is away from the pole 43 in the rear direction. A distance from the holding position P1 to the locked pin 35 in the front-rear direction of the AUV 10 and a distance from the pole 43 to the locking device 51 (more specifically, a below-described fitting hole 52) in the front-rear direction of the charging station 40 are substantially equal to each other. The locking of the locked pin 35 by the locking device 51 is performed in such a manner that the holding device 31 holds the pole 43, and the AUV 10 reaches a predetermined rotational position relative to the pole 43 and then moves downward.

Figure 9:
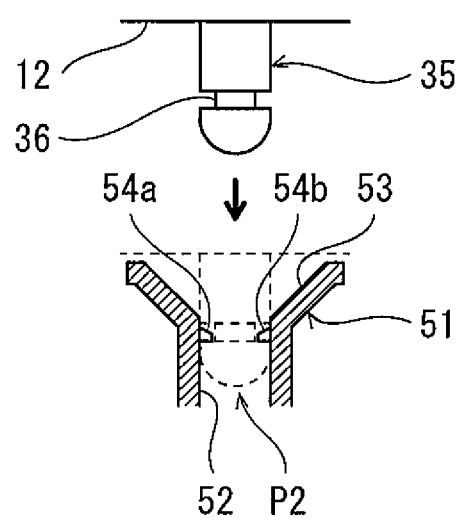
FIG. 9 is a diagram for explaining fixing of a locked pin of the AUV by a locking device of the charging station shown in FIG. 1.

FIG. 9 is a diagram for explaining the locking of the locked pin 35 by the locking device 51. The locking device 51 includes a fitting hole 52, a guide surface 53, and a pair of locking claws 54a and 54b (corresponding to a "locking portion" of the present invention).

The fitting hole 52 is a hole in which the locked pin 35 is fitted. The fitting hole 52 is also a locking position P2 at which the locked pin 35 is locked. The fitting hole 52 is open upward. When the AUV 10 moves downward, the locked pin 35 is fitted in the fitting hole 52 from above.

When the AUV 10 moves downward, the locked pin 35 contacts the guide surface 53, and the guide surface 53 guides the locked pin 35 to the fitting hole 52. The guide surface 53 is an inclined surface formed such that an opening thereof gradually widens as it extends upward. When the AUV 10 moves downward with a lower end portion of the locked pin 35 contacting the guide surface 53, the guide surface 53 pushes the contacted locked pin 35 to change the direction of the underwater vehicle main body 12, and the locked pin 35 is guided to the locking position P2 along the guide surface 53. Therefore, even when the AUV 10 moves downward in a state where the fitting hole 52 and the locked pin 35 are displaced from each other to some extent in a plan view, the locked pin 35 is surely guided to the fitting hole 52 by contacting the guide surface 53.

The pair of locking claws 54a and 54b lock the locked pin 35 guided in the fitting hole 52. As shown in FIG. 9, the locked pin 35 includes a groove portion 36 in which the pair of locking claws 54a and 54b are fitted. By this fitting of the pair of locking claws 54a and 54b in the groove portion 36, the locked pin 35 is locked in the fitting hole 52.

Specifically, the pair of locking claws 54a and 54b are provided at a wall portion of the fitting hole 52 and are configured to be able to project from the wall portion. Each of the locking claws 54a and 54b moves between a projecting position at which the locking claw 54a, 54b projects from the wall portion of the fitting hole 52 and a retracting position at which the locking claw 54a, 54b retracts in the wall portion of the fitting hole 52. When the pair of locking claws 54a and 54b move to the projecting positions to be fitted in the groove portion 36 of the locked pin 35, the pair of locking claws 54a and 54b lock the locked pin 35. When the pair of locking claws 54a and 54b are located at the retracting positions, the pair of locking claws 54a and 54b release the locking state of the locked pin 35.

In the present embodiment, the locking claws 54a and 54b are being biased toward the projecting positions. When the locking claws 54a and 54b are pushed by the lower end portion of the locked pin 35 that is to be fitted in the fitting hole 52, the locking claws 54a and 54b move toward the retracting positions. When the height of the groove portion 36 of the locked pin 35 and the heights of the locking claws 54a and 54b coincide with each other, the locking claws 54a and 54b return to the projecting positions. The locking device 51 includes an actuator (not shown) configured to move the locking claws 54a and 54b from the projecting positions to the retracting positions by a control signal transmitted from the control device 16. When the AUV 10 separates from the charging station 40, the control device 16 drives the actuator to move the locking claws 54a and 54b from the projecting positions to the retracting positions.

As shown in FIG. 6, supporting portions 55 are provided at the upper portion of the base 42 so as to be located at both respective sides of the locking device 51 in the left-right direction. The supporting portions 55 include respective surfaces that contact a lower portion of the AUV 10. The supporting portions 55 support from below the AUV 10 in which the locked pin 35 has been locked by the locking device 51.

A main control portion 61 and a power supply control portion 62 are provided at the base 42. The main control portion 61 controls communication with the underwater vehicle-side optical transmitter 22 and underwater vehicle-side optical receiver 23 of the AUV 10, the communication being performed by using the station-side optical transmitter 45 and the station-side optical receiver 46. The power supply control portion 62 controls the execution and stop of the power supply from the power supplying portion 41 to the power receiving portion 11.

Docking of AUV with Charging Station

Figure 10A:
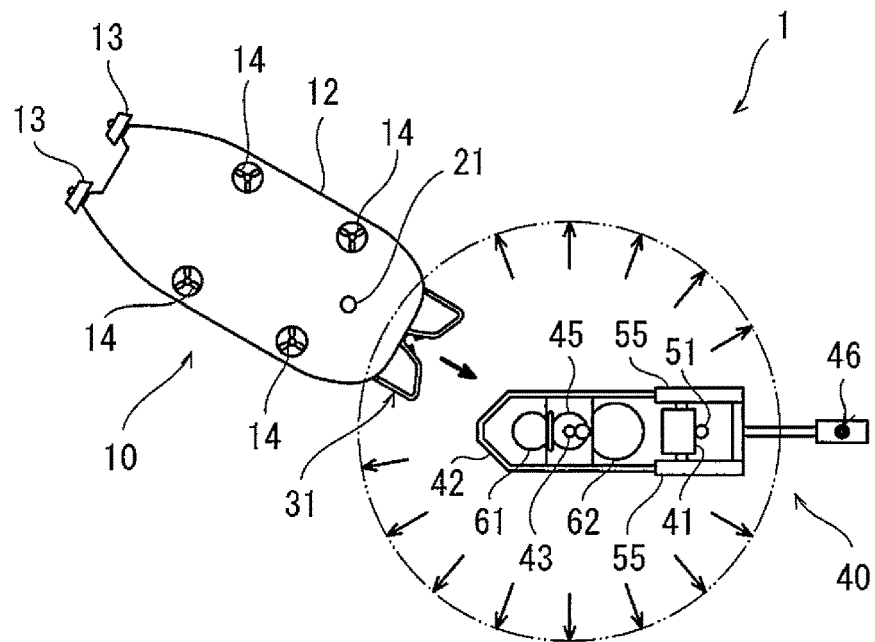
FIG. 10A is a plan view showing that the AUV approaches the charging station.
Figure 10B:
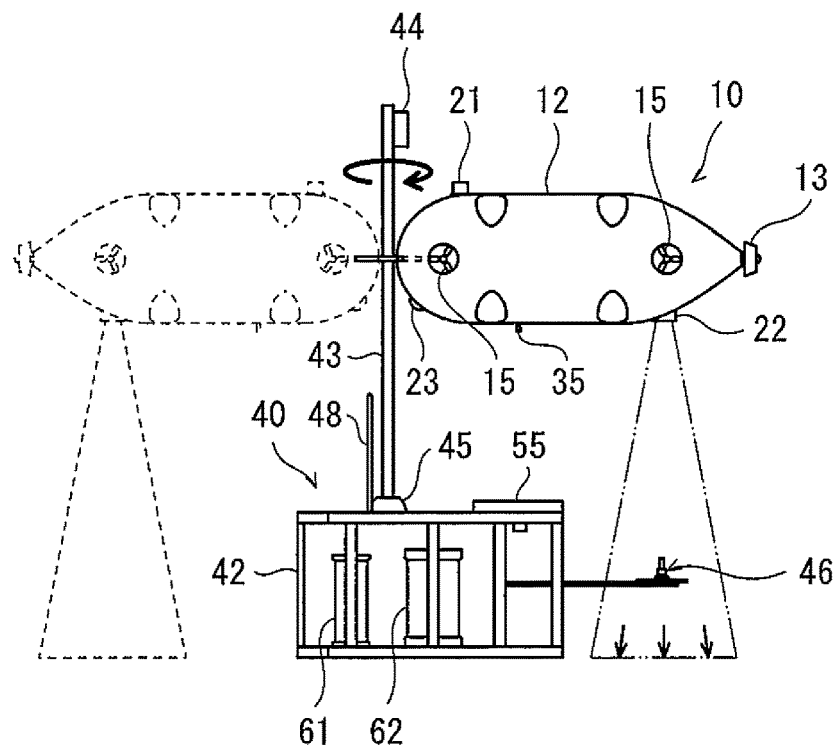
FIG. 10B is a side view showing that the AUV shown in FIG. 1 holds a pole and rotates about the pole.

Next, a process of making the AUV 10 dock with the charging station 40 in the charging system 1 will be described with reference to FIGS. 10A and 10B. FIG. 10A is a plan view showing that the AUV 10 approaches the charging station 40. FIG. 10B is a side view showing that the AUV 10 rotates about the pole 43 with the holding device 31 holding the pole 43. In FIG. 10A, a range where the light emitted from the station-side optical transmitter 45 reaches is schematically shown by a two-dot chain line. In FIG. 10B, a range where the light emitted from the underwater vehicle-side optical transmitter 22 reaches is schematically shown by a two-dot chain line.

First, when the AUV 10 is located adequately away from the charging station 40, the AUV 10 approaches the charging station 40 by the acoustic positioning system. Specifically, the AUV 10 measures the position of the AUV 10 relative to the charging station 40 based on the sound waves transmitted from the transponder 44 of the charging station 40. The control device 16 of the AUV 10 controls the main propulsion units 13, the vertical thrusters 14, and the horizontal thrusters 15 based on the acquired position data of the AUV 10. With this, the AUV 10 moves toward the charging station 40.

As shown in FIG. 10A, when the AUV 10 has adequately approached the charging station 40 and has entered a range where the underwater vehicle-side optical receiver 23 can receive the light emitted from the station-side optical transmitter 45, the control device 16 switches from the approaching operation performed by the acoustic positioning to an approaching operation performed by using the underwater vehicle-side optical receiver 23 as the direction detector.

Specifically, the underwater vehicle-side optical receiver 23 compares the received light intensities of the light receiving elements of the light receiving array of the underwater vehicle-side optical receiver 23 to detect the coming direction of the light emitted from the station-side optical transmitter 45. The control device 16 controls the main propulsion units 13, the vertical thrusters 14, and the horizontal thrusters 15 based on the acquired coming direction of the light to move the AUV 10 toward the charging station 40 such that the holding device 31 of the AUV 10 contacts the pole 43 of the charging station 40.

When the pole 43 contacts one of the pair of guide portions 32a and 32b of the holding device 31, the pole 43 is guided to the holding position P1 along the contacted guide portion 32a or 32b as described above (see FIG. 8). Then, the pair of holding claws 33a and 33b hold the pole 43 at the holding position P1 so as to be rotatable relative to the pole 43.

Next, as shown in FIG. 10B, the control device 16 controls the horizontal thrusters 15 such that the AUV 10 in which the holding device 31 has held the pole 43 reaches a rotational position (angular range a (see FIG. 6)) where the station-side optical receiver 46 receives the light emitted from the underwater vehicle-side optical transmitter 22, the rotational position being set relative to the pole 43.

Specifically, in the AUV 10, the underwater vehicle-side optical transmitter 22 is rotated relative to the pole 43 by driving the horizontal thrusters 15. On the other hand, in the charging station 40, the main control portion 61 monitors a reception state of the station-side optical receiver 46 that receives the optical signal from the underwater vehicle-side optical transmitter 22. The main control portion 61 transmits a signal indicating the reception state as an optical signal from the station-side optical transmitter 45 to the underwater vehicle-side optical receiver 23. Thus, the control device 16 controls the horizontal thrusters 15 such that the underwater vehicle-side optical transmitter 22 can communicate with the station-side optical receiver 46.

When the station-side optical receiver 46 reaches such a position as to be able to receive the optical signal from the underwater vehicle-side optical transmitter 22, the control device 16 controls the vertical thrusters 14 to make the underwater vehicle main body 12 move downward along the pole 43. As described above, when the underwater vehicle main body 12 is in the middle of moving downward along the pole 43, the rotation restricting portion 48 enters between the pair of guide portions 32a and 32b, and with this, mechanically restricts the rotation range of the underwater vehicle main body 12 relative to the pole 43. Therefore, the rotational position of the underwater vehicle main body 12 relative to the pole 43 can be determined further accurately.

When the underwater vehicle main body 12 moves downward, and the locked pin 35 contacts the guide surface 53 of the locking device 51, the locked pin 35 is guided to the fitting hole 52 along the guide surface 53 as described above (see FIG. 9). Then, the pair of locking claws 54a and 54b locks the locked pin 35 in the fitting hole 52. Thus, the docking of the AUV 10 with the charging station 40 is completed. When the AUV 10 has docked with the charging station 40, the power supplying portion 41 and the power receiving portion 11 are opposed to each other in the upper-lower direction, and therefore, electric power supply from the power supplying portion 41 to the power receiving portion 11 is realized. Further, when the AUV 10 has docked with the charging station 40, the underwater vehicle-side optical transmitter 22 and the station-side optical receiver 46 are opposed to each other, and the underwater vehicle-side optical receiver 23 and the station-side optical transmitter 45 are opposed to each other. Therefore, the AUV 10 and the charging station 40 can communicate with each other.

As described above, in the charging system 1 for the AUV 10 according to the present embodiment, even when the AUV 10 enters the charging station 40 while being displaced from the charging station 40 to some extent, the pole 43 contacts the guide portion 32a or 32b of the holding device 31 from the proceeding-direction side of the underwater vehicle main body 12, and the contacted guide portion 32a or 32b of the holding device 31 guides the pole 43 to the holding position P1. Then, the holding claws 33a and 33b of the holding device 31 hold the pole 43 so as to be rotatable relative to the pole 43. Therefore, the AUV 10 can approach the charging station 40 from any 360° direction.

Further, in the present embodiment, by using a simple determination method that is whether or not the station-side optical receiver 46 receives the light emitted from the underwater vehicle-side optical transmitter 22, the control device 16 can control the horizontal thrusters 15 to perform positioning between the power receiving portion 11 and the power supplying portion 41. Therefore, the positioning between the charging station 40 and the AUV 11 for charging the AUV 10 can be easily performed.

Further, in the present embodiment, the positioning between the power receiving portion 11 and the power supplying portion 41 can be performed by utilizing the optical transmitters and the optical receivers for mutual optical communication between the charging station 40 and the AUV 10.

Further, in the present embodiment, the underwater vehicle-side optical receiver 23 is made to serve as the direction detector that detects the coming direction of the light radially emitted from the station-side optical transmitter 45, and the control device 16 controls the horizontal thrusters 15 based on the coming direction detected by the direction detector such that the AUV 10 proceeds, and the guide portion 32a or 32b contacts the pole 43. Therefore, by making the AUV 10 proceed toward the light emitted from the station-side optical transmitter 45, the AUV 10 can be made to approach the pole with a high degree of accuracy.

Further, in the present embodiment, the locking device 51 locks the locked pin 35 provided at the underwater vehicle main body 12, and with this, the position of the underwater vehicle main body 12 can be fixed to the rotational position where the station-side optical receiver 46 receives the light emitted from the underwater vehicle-side optical transmitter 22. Therefore, even when the underwater vehicle main body 12 receives water flow due to the influence of tidal current or the like, the underwater vehicle main body 12 can be made to stay at the target rotational position without driving the horizontal thrusters 15.

Further, in the present embodiment, the locking device 51 includes the guide surface 53 and the locking claws 54a and 54b. The guide surface 53 forms the opening that gradually widens in the upper direction. When the AUV 10 moves downward, the locked pin 35 contacts the guide surface 53, and the guide surface 53 guides the locked pin 35 to the locking position P2. The locking claws 54a and 54b lock the locked pin 35 at the locking position P2. Therefore, even when the AUV 10 moves downward with the locked pin 35 displaced relative to the locking position P2 to some extent or even when the AUV 10 moves downward with the rotational position of the underwater vehicle main body 12 displaced relative to the pole 43 to some extent, the guide surface 53 absorbs such displacement and guides the locked pin 35 to the locking position P2. Therefore, the locked pin 35 of the AUV 10 can be guided to the locking position P2 with a high degree of accuracy.

Further, in the present embodiment, the charging station 40 includes the rotation restricting portion 48. Therefore, even when the underwater vehicle main body 12 receives water flow such as tidal current while moving downward, the rotation range of the underwater vehicle main body 12 relative to the pole 43 is mechanically restricted by the rotation restricting portion 48. This can reduce the load of the horizontal thrusters 15 that make the underwater vehicle main body 12 stay at the target rotational position while the underwater vehicle main body 12 is moving downward.

Further, in the present embodiment, as the rotation restricting portion 48 extends downward from the upper end portion 48a, the rotation restricting portion 48 widens in such a direction that the pair of guide portions 32a and 32b separate from each other. Therefore, as the underwater vehicle main body 12 moves downward along the pole 43, a rotatable range of the underwater vehicle main body 12 relative to the pole 43 can be narrowed gradually. With this, the locked pin 35 of the AUV 10 can be guided to the locking position P2 with a high degree of accuracy.

Embodiment 2

Next, a charging system 1A according to Embodiment 2 will be described with reference to FIGS. 11 to 15. In the present embodiment, detailed explanations of the same components as Embodiment 1 are omitted. Further, the definitions of the directions of an AUV 110 and a charging station 140 in the charging system 1A are the same as those in Embodiment 1.

Figure 11:
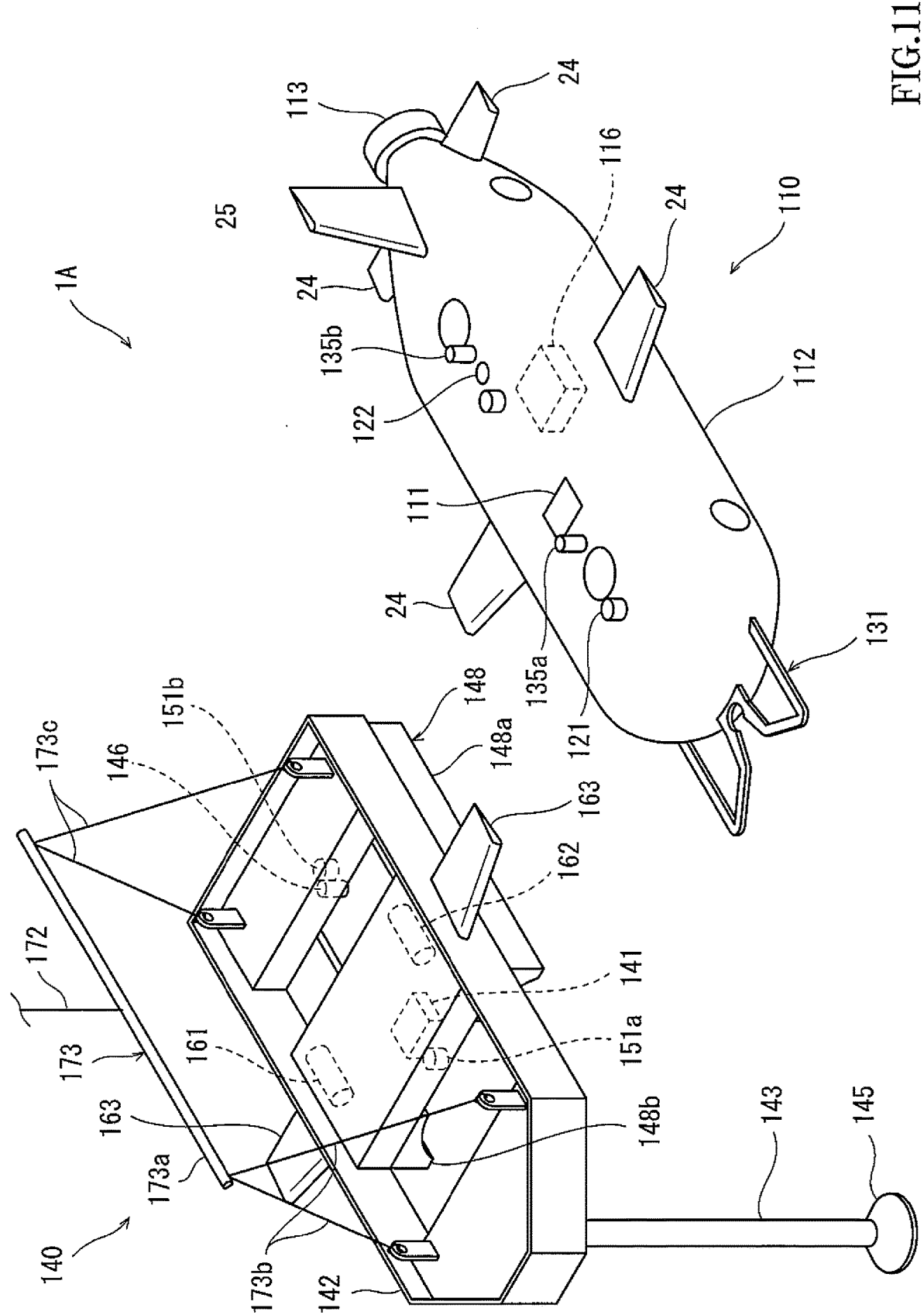
FIG. 11 is a diagram showing the schematic configuration of the charging system for the AUV according to Embodiment 2 of the present invention.
Figure 12:
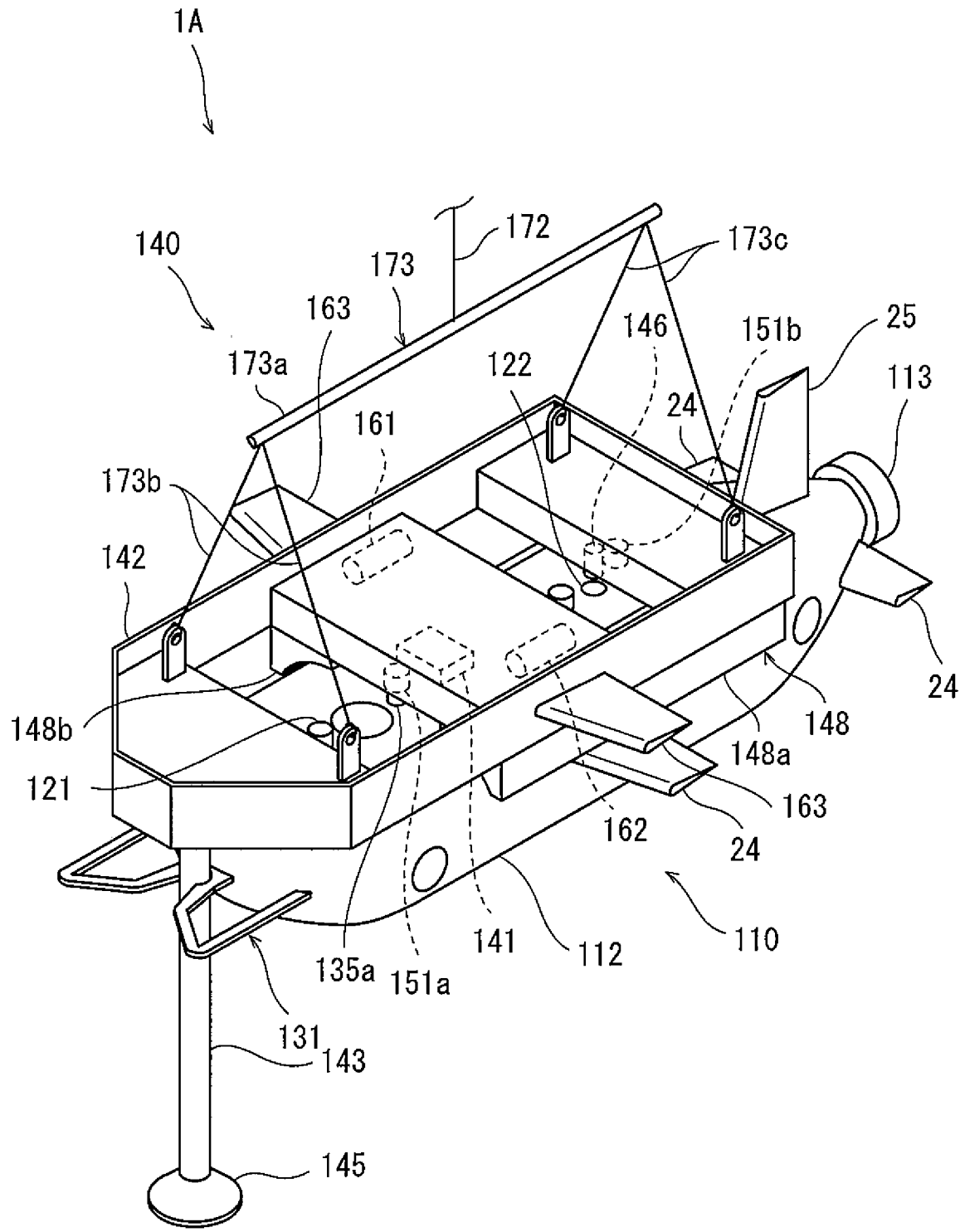
FIG. 12 is a diagram showing that the AUV has docked with the charging station shown in FIG. 11.
Figure 13:
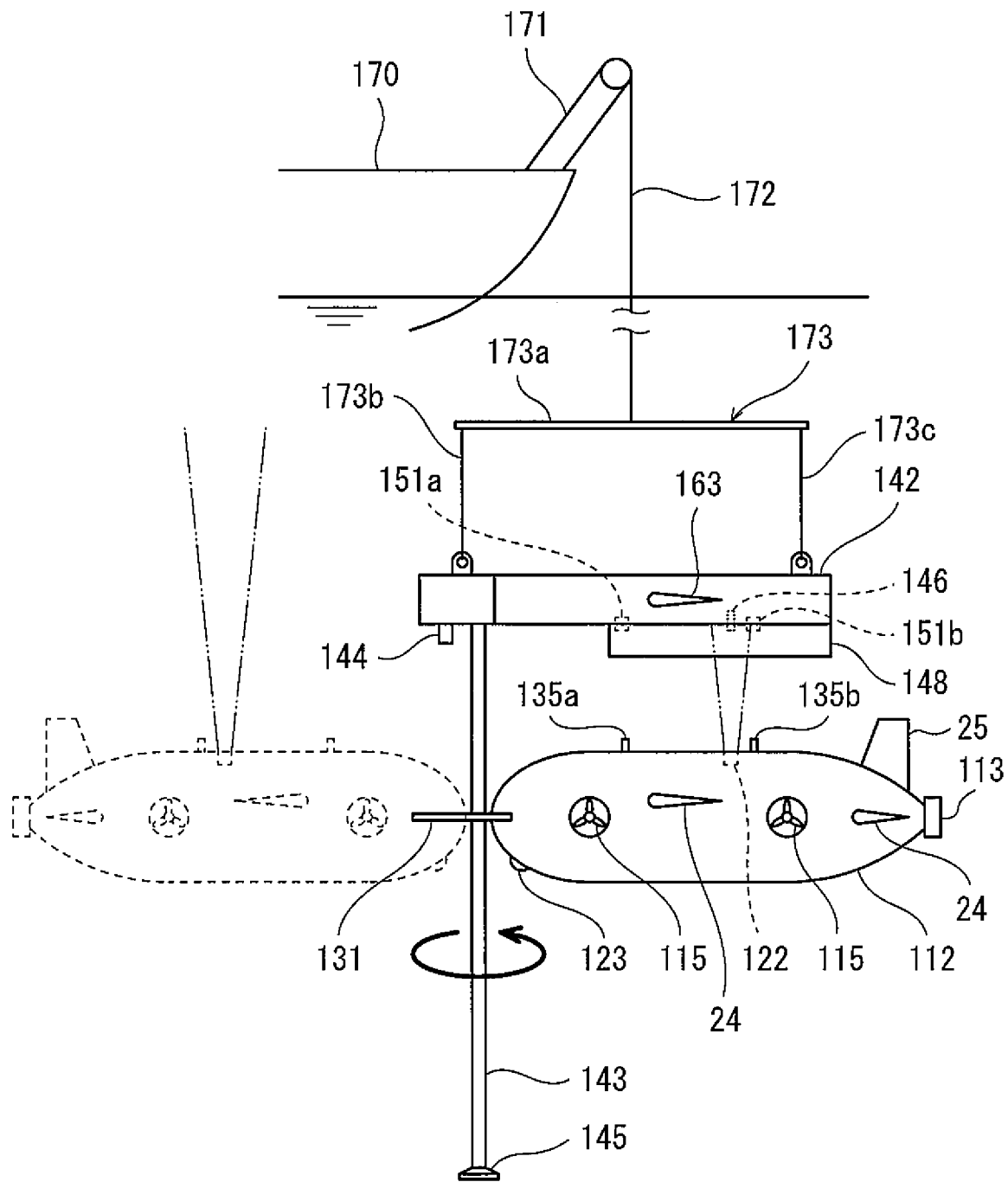
FIG. 13 is a side view showing that the AUV shown in FIG. 11 holds the pole and rotates about the pole.

FIG. 11 is a diagram showing the schematic configuration of the charging system 1A according to Embodiment 2. FIG. 12 is a diagram showing that the AUV 110 has docked with the charging station 140 in the charging system 1A. FIG. 13 is a side view showing that the AUV 110 holds a pole 143 and rotates about the pole 143. As shown in FIG. 13, in the charging system 1A of the present embodiment, a base 142 of the charging station 140 is not fixed to the bottom of water, and the charging station 140 is suspended from and supported by a water floating body 170 floating on water. Details of the suspending of the charging station 140 will be described later.

Further, in the present embodiment, unlike Embodiment 1, the pole 143 extends downward from the base 142. To be specific, in the present embodiment, unlike Embodiment 1 shown in FIGS. 2 and 3, the AUV 110 is arranged under the charging station 140 and docks with the charging station 140. More specifically, after a holding device 131 of the AUV 110 holds the pole 143, the AUV 110 moves upward along the pole 143. With this, the AUV 110 docks with the charging station 140.

Therefore, in the present embodiment, a power receiving portion 111 is provided at an upper portion of an underwater vehicle main body 112. Further, a power supplying portion 141 is provided at a position that is located at a lower portion of the base 142 and is away from the pole 143 in the horizontal direction (rear direction). When the AUV 110 has docked with the charging station 140, the power receiving portion 111 and the power supplying portion 141 are opposed to each other in the upper-lower direction.

Further, an underwater vehicle-side optical transmitter 122 (corresponding to a "light emitter" of the present invention) configured to transmit the optical signal upward is provided at a rear-upper portion of the underwater vehicle main body 112, and a station-side optical receiver 146 (corresponding to a "light receiver" of the present invention) including a light receiving portion facing downward is provided at a position that is located at a lower portion of the base 142 and is away from the pole 143 in the horizontal direction. When the AUV 110 has docked with the charging station 140, the station-side optical receiver 146 and the underwater vehicle-side optical transmitter 122 are opposed to each other in the upper-lower direction, and the station-side optical receiver 146 can receive the optical signal from the underwater vehicle-side optical transmitter 122.

Further, a pair of locked pins 135a and 135b (corresponding to a "locked portion" of the present invention) extending upward is provided at an upper portion of the underwater vehicle main body 112. The pair of locked pins 135a and 135b are provided at the upper portion of the underwater vehicle main body 112 so as to be line up in the front-rear direction with a gap therebetween. Further, a pair of locking devices 151a and 151b configured to respectively lock the pair of locked pins 135a and 135b are provided at the base 142. Since each of the locked pins 135a and 135b is the same in configuration as the locked pin 35 of Embodiment 1, and each of the locking devices 151a and 151b is the same in configuration as the locking device 51 of Embodiment 1, detailed explanations thereof are omitted.

Further, the AUV 110 includes a thrust generating apparatus, a control device 116, an acoustic positioning device 121, the underwater vehicle-side optical transmitter 122, an underwater vehicle-side optical receiver 123, and the holding device 131, and the thrust generating apparatus includes a main propulsion unit 113, horizontal thrusters 115, and the like. The underwater vehicle-side optical receiver 23 is provided at a front-lower portion of the underwater vehicle main body 112. Further, the charging station 140 includes a transponder 144, a station-side optical transmitter 145, the station-side optical receiver 146, a main control portion 161, and a power supply control portion 162. The station-side optical transmitter 145 is provided at a lower end portion of the pole 143. Since these components are the same as those in Embodiment 1, explanations thereof are omitted.

Further, a rotation restricting portion 148 that is different in configuration from the rotation restricting portion 48 of Embodiment 1 is provided at the base 142. The rotation restricting portion 148 mechanically restricts the rotation range of the underwater vehicle main body 112 relative to the pole 143. The rotation restricting portion 148 is located at a side of the pole 143 which side is the same as a side where the power supplying portion 141 is arranged, i.e., located at the rear side of the pole 143. The rotation restricting portion 148 includes a pair of projecting portions 148a and 148b projecting downward from the base 142.

Figure 14:
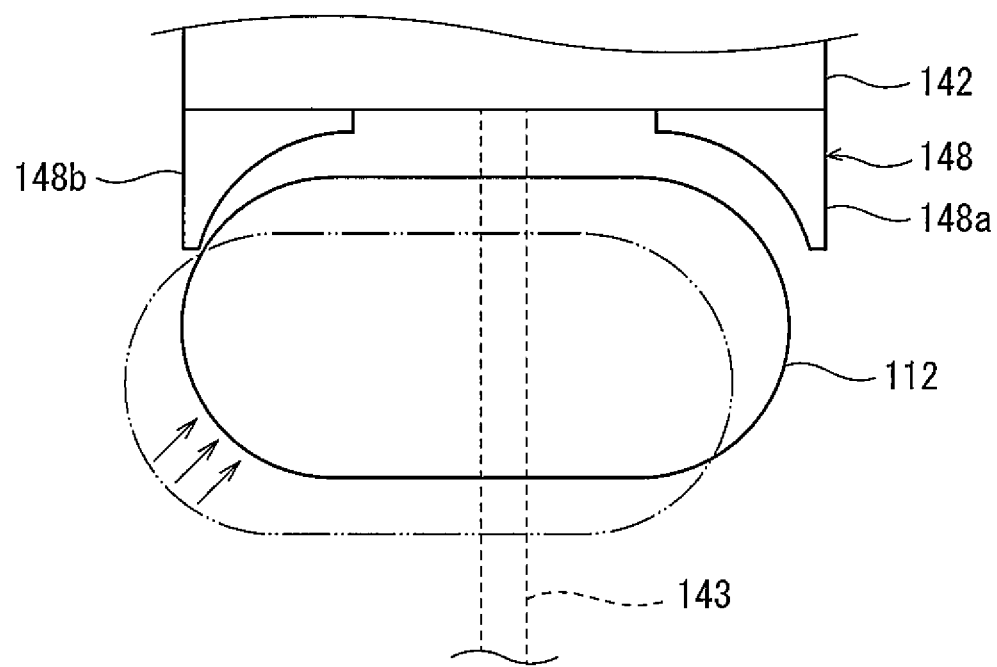
FIG. 14 is a schematic diagram for explaining the action of a rotation restricting portion when the AUV shown in FIG. 11 moves upward along the pole.

FIG. 14 is a schematic diagram for explaining the action of the rotation restricting portion 148 when the AUV 110 moves upward along the pole 143. In FIG. 14, the rotation restricting portion 148 and the underwater vehicle main body 112 in which the holding device 131 has held the pole 143 are schematically shown in a front view of the charging station 140. In FIG. 14, the pole 143 is shown by broken lines. As shown in FIG. 14, the pair of projecting portions 148a and 148b are lined up in the left-right direction so as to be spaced apart from each other. Therefore, when the underwater vehicle main body 112 is in the middle of moving upward along the pole 143, the underwater vehicle main body 112 enters between the pair of projecting portions 148a and 148b, and this restricts the rotation range of the underwater vehicle main body 112 relative to the pole 143.

Further, as shown in FIG. 14, an interval between lower portions of the pair of projecting portions 148a and 148b gradually widens in the left-right direction of the charging station 140 as the pair of projecting portions 148a and 148b extend downward from the base 142. The interval between the pair of projecting portions 148a and 148b gradually narrows in the left-right direction of the charging station 140 as the pair of projecting portions 148a and 148b extend upward. In the present embodiment, lower surfaces of the pair of projecting portions 148a and 148b in the front view of the charging station 140 have respective shapes corresponding to a contour of the underwater vehicle main body 112 in a front view of the AUV 110. As above, as the power supplying portion 141 and the power receiving portion 111 approach each other, the rotation restricting portion 148 gradually narrows the rotation range of the underwater vehicle main body 112 relative to the pole 143. Therefore, the locked pins 135a and 135b of the AUV 110 can be guided to respective locking positions of the locking devices 151a and 151b with a high degree of accuracy.

Further, in the present embodiment, horizontal wings 163 are provided at the base 142 of the charging station 140. The horizontal wings 163 serve to define a vertical-direction posture of the charging station 110 which has received water flow. Further, a plurality of horizontal wings 24 and one vertical wing 25 are provided at the underwater vehicle main body 112. The horizontal wings 24 serve to define a vertical-direction posture of the underwater vehicle main body 112 which has received water flow. The vertical wing 25 serves to define a horizontal-direction posture of the underwater vehicle main body 112 which has received water flow.

As described above, according to the charging system 1A of the present embodiment, the charging station 140 is suspended from and supported by the water floating body 170 floating on water. The charging station 140 is suspended under water by a cord 172 extending from the water floating body 170. In the present embodiment, the water floating body 170 is a ship that sails on water. The cord 172 is not especially limited. In the present embodiment, the cord 172 includes a power transmission cable used to supply electricity from the water floating body 170 to the charging station 140 and/or a communication cable used to communicate with the water floating body 170.

As shown in FIG. 11, a portion of the cord 17 which portion is located in the vicinity of the charging station 140 or an end portion of the cord 17 is coupled to a plurality of points (in the present embodiment, four points) of an upper portion of the base 142 by a coupling member 173. In the present embodiment, the coupling member 173 includes a rod-shaped body 173a, two string-shaped bodes 173b, and two string-shaped bodies 173c. The rod-shaped body 173a is located above the charging station 140 and extends in the front-rear direction. The two string-shaped bodes 173b extend from a front end of the rod-shaped body 173a to two respective points located at a front-upper portion of the base 142. The two string-shaped bodies 173c extend from a rear end of the rod-shaped body 173a to two respective points located at a rear-upper portion of the base 142. It should be noted that such coupling between the cord 172 and the base 142 is just one example, and for example, the cord 172 may be directly coupled to the base 142. Further, in the drawings, electric wires and the like extending from the cord 172 to the main control portion 161, the power supply control portion 162, and the like are omitted.

Figure 15:
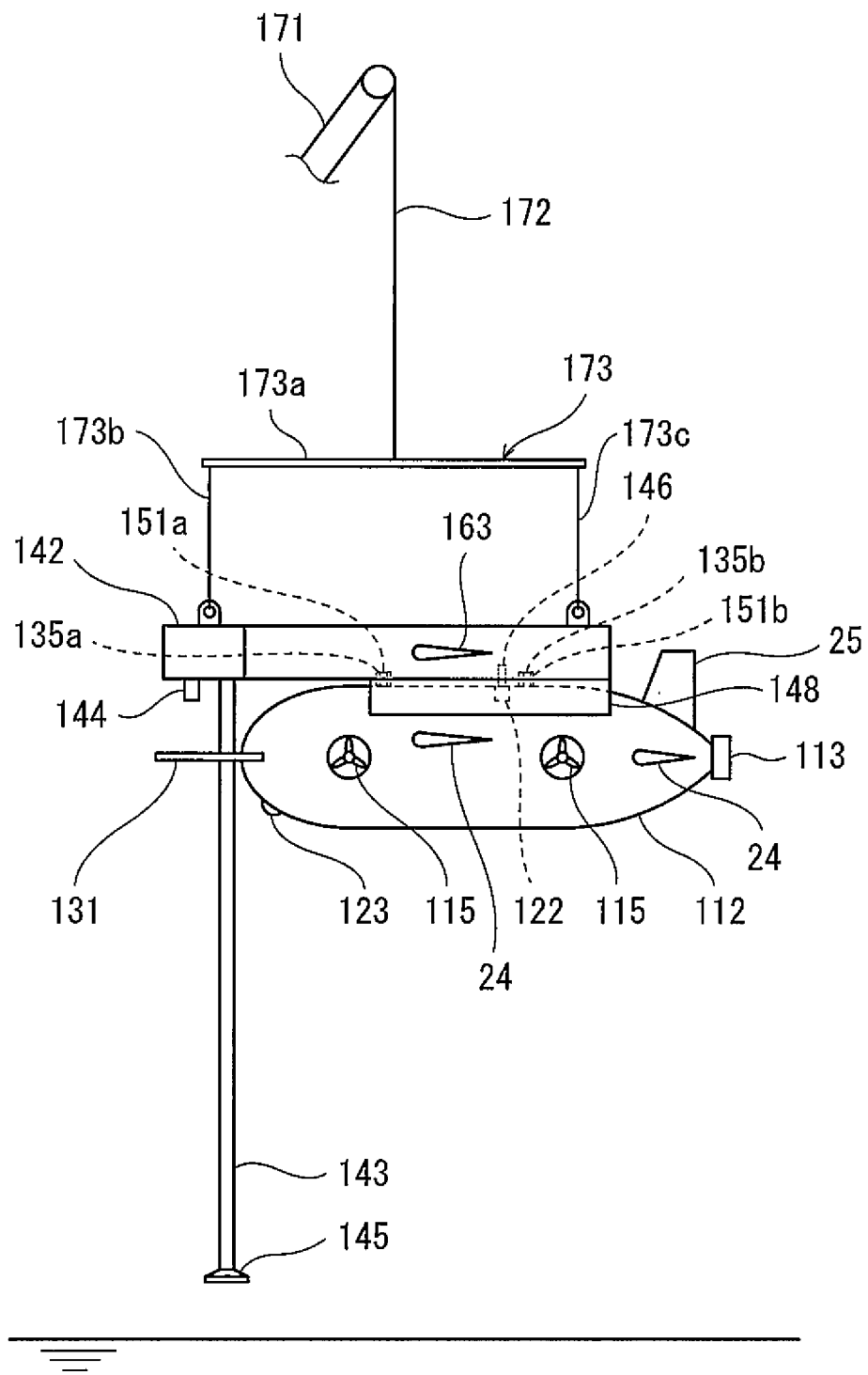
FIG. 15 is a side view showing that the charging station with which the AUV shown in FIG. 12 has docked is lifted up in the air.

Further, the water floating body 170 includes a load lifting facility 171. The load lifting facility 171 pulls (for example, winds up) the cord 172 to lift up in the air the charging station 140 with which the AUV 110 has docked. FIG. 15 is a side view showing that the charging station 140 with which the AUV 110 has docked is lifted up in the air. The load lifting facility 171 is, for example, a crane. In the present embodiment, portions of the cord 172 and the base 142 which portions are coupled to each other by the coupling member 173 are adjusted such that when the AUV 110 and the charging station 140 which have docked with each other are lifted up in the air by the load lifting facility 171, the center of gravity of the AUV 110 and the charging station 140 which have docked with each other is substantially located on an extended line of the cord 172 extending downward from the load lifting facility 171. Therefore, as shown in FIG. 15, even when the AUV 110 and the charging station 140 which have docked with each other is lifted up in the air by the load lifting facility 171, the AUV 110 and the charging station 140 maintain substantially the same posture (i.e., the posture in which the pole 143 extends substantially in the vertical direction) as when the AUV 110 and the charging station 140 are located under water.

Launching of AUV and Lifting and Recovering of AUV

Next, a method of launching the AUV 110 by using the charging system 1A of the present embodiment and a method of lifting and recovering the AUV 110 by using the charging system 1A of the present embodiment will be described.

First, a process of launching the AUV 110 under water will be described. The water floating body 170 on which the AUV 110 and the charging station 140 are loaded is stopped above the underwater where the AUV 110 is made to work. Then, by using the load lifting facility 171, the charging station 140 with which the AUV 110 has docked is lifted up in the air and launched under water. When the charging station 140 moves downward under water and reaches a predetermined position, the locking of the locked pins 135a and 135b by the locking devices 151a and 151b is released. Then, the AUV 110 drives, for example, the vertical thrusters to move along the pole 143 such that the locking devices 151a and 151b and the locked pins 135a and 135b separate from each other. After that, the holding of the pole 143 by the holding device 131 is released. Thus, the docking of the AUV 110 with the charging station 140 is released, and the AUV 110 starts predetermined work under water.

Next, a process of lifting and recovering the AUV 110 from the underwater to the water floating body 170 will be described.

The water floating body 170 is stopped at a position that is on water and above the bottom of water or the underwater where the AUV 110 is working. The charging station 140 is suspended under water from the water floating body 170 by the cord 172.

The AUV 110 which has finished the work approaches the charging station 140 under water and docks with the charging station 140. Since the method by which the AUV 110 approaches the charging station 140 under water is the same as that of Embodiment 1, an explanation thereof is omitted.

The method by which the AUV 110 docks with the charging station 140 under water in the present embodiment and the method by which the AUV 10 docks with the charging station 40 under water in Embodiment 1 are substantially the same as each other except that that: in Embodiment 1, the AUV 10 docks with the charging station 40 from above the charging station 40; and in the present embodiment, the AUV 110 docks with the charging station 140 from under the charging station 140 (i.e., the direction in which the underwater vehicle main body 112 moves along the pole 143 is opposite to that of Embodiment 1).

To be specific, the AUV 110 in which the holding device 131 has held the pole 143 controls the horizontal thrusters 115 such that the station-side optical receiver 146 reaches such a rotational position relative to the pole 143 as to be able to receive the light emitted from the underwater vehicle-side optical transmitter 122. Then, when the station-side optical receiver 146 has reached such a position as to be able to receive the light emitted from the underwater vehicle-side optical transmitter 122, the underwater vehicle main body 112 is made to move upward along the pole 143, and the locked pins 135a and 135b are then locked by the locking devices 151a and 151b.

When the docking of the AUV 110 with the charging station 140 is completed, the charging station 140 transmits to the water floating body 170 an informing signal informing the completion of the docking of the AUV 110 with the charging station 140. The informing signal may be transmitted through, for example, a communication line included in the cord 172. Or, the informing signal may be transmitted through acoustic communication when the charging station 140 includes an acoustic communication apparatus configured to communicate with the water floating body 170 by using sound. It should be noted that whether or not the docking has been completed may be determined by, for example, sensors provided at the respective locking positions P1 of the pair of locking devices 151a and 151b and configured to detect the respective locked pins 135a and 135b.

After the water floating body 170 has received the informing signal, a crew member of the water floating body 170 operates the load lifting facility 171, and with this, the charging station 140 with which the AUV 110 has docked is pulled up and lifted up in the air. In the step of pulling up the charging station 140, the charging station 140 with which the AUV 110 has docked is lifted up in the air while maintaining the posture of the charging station 140 with which the AUV 110 has docked under water.

It should be noted that since this lifting and recovering method can easily lift and recover the AUV to the water floating body, this method is effective for stations other than the charging station, i.e., for stations which do not include power supplying portions.

The present embodiment can obtain the same effects as Embodiment 1.

Further, in the present embodiment, the pole 143 extends downward from the base 142, and the cord 172 extends from the base 142 side to above water in a direction opposite to the pole 143. Therefore, the cord 172 and the base 142 can be easily coupled to each other so as not to interfere with the AUV 110 that approaches the pole 143.

Further, in the present embodiment, the water floating body 170 includes the load lifting facility 171 configured to wind up the cord 172 to lift up in the air the charging station 140 with which the AUV 110 has docked. Therefore, the AUV 110 which has docked with the charging station 140 can be lifted and recovered to the water floating body from the underwater and can be launched from the water floating body to the underwater.

Since the pole 143 extends downward from the base 142, the AUV 110 is arranged under the charging station 140 and docks with the charging station 140. Therefore, the degree of freedom of the design of a portion where the base 142 and the cord 172 are coupled to each other improves. On this account, the coupling between the base 142 and the cord 172 can be easily performed such that, for example, when the charging station 140 with which the AUV 110 has docked is lifted up in the air, unnecessary stress does not act on respective portions of the charging station 140.

Modified Example 1

Figure 16:
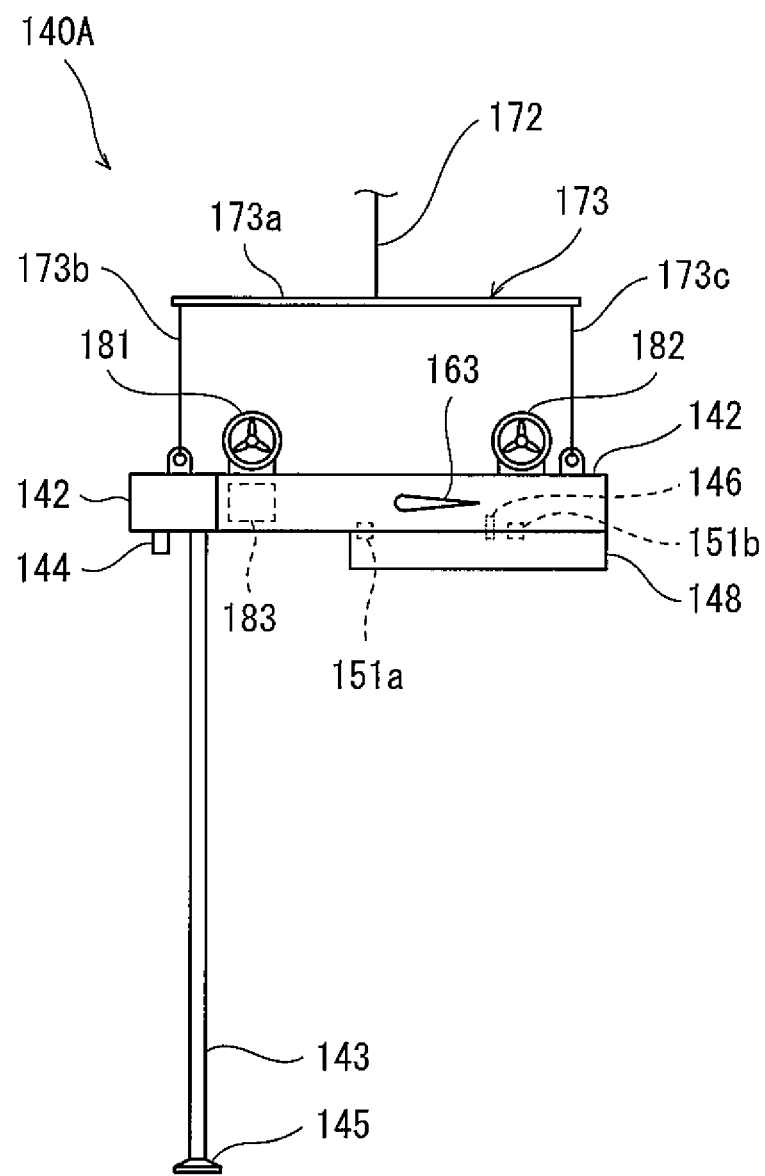
FIG. 16 is a side view of the charging station according to Modified Example 1.

FIG. 16 is a side view of a charging station 140A according to Modified Example 1. The charging station 140A according to Modified Example 1 includes the components of the charging station 140 of Embodiment 2 and a thrust generating apparatus configured to maintain at least one of the posture under water and the direction under water.

In Modified Example 1, the thrust generating apparatus of the charging station 140A includes two horizontal thrusters 181 and 182 configured to generate thrust in the left-right direction of the charging station 140. The two horizontal thrusters 181 and 182 are provided at the upper portion of the base 142. The two horizontal thrusters 181 and 182 are arranged so as to generate the thrust in the left-right direction of the charging station 140A. The two horizontal thrusters 181 and 182 are lined up in the front-rear direction of the charging station 140A so as to be spaced apart from each other. More specifically, the two horizontal thrusters 181 and 182 are lined up so as to sandwich an extended line of the cord 172 in the front-rear direction. The two horizontal thrusters 181 and 182 are arranged so as to generate the thrust in the left-right direction of the charging station 140A. The two horizontal thrusters 181 and 182 are controlled by the main control portion 161.

For example, if the charging station 140A turns under water while the charging station 140A is moving downward under water after being launched from the water floating body 170 to the underwater, the cord 172 is twisted. The two horizontal thrusters 181 and 182 are driven to, for example, untwist the cord 172.

Specifically, in Modified Example 1, a measuring device 183 is provided at the base 142. The measuring device 183 measures a direction in which the base 142 has turned about a vertical axis passing through the charging station 140A and an angular displacement amount of the base 142 which has turned about the vertical axis. The measuring device 183 includes, for example, a gyro sensor. For example, the measuring device 183 starts the measurement after the charging station 140A is launched from the water floating body 170 to the underwater. The main control portion 161 makes the two horizontal thrusters 181 and 182 generate respective thrusts that act in respective directions opposite to each other. With this, the main control portion 161 makes the base 142 turn in such a direction that the cord 172 is untwisted. Specifically, the main control portion 161 drives the two horizontal thrusters 181 and 182 to make the base 142 turn in a direction opposite to the direction measured by the measuring device 183 such that the angular displacement amount measured by the measuring device 183 decreases.

Further, for example, when the AUV 110 rotates about the pole 143 with the holding device 131 holding the pole 143, the charging station 140A may rotated integrally with the AUV 110 by friction between the pole 143 and the holding device 131. The two horizontal thrusters 181 and 182 may be driven to prevent the charging station 140A from rotating integrally with the AUV 110.

Specifically, the main control portion 161 may drive the two horizontal thrusters 181 and 182 such that the direction of the charging station 140A is kept constant while the AUV 110 is rotating with the holding device 131 holding the pole 143. For example, the charging station 140A includes an azimuth detector configured to detect an azimuth in which the charging station 140A is directed. For example, the above-described measuring device 183 may be used as the azimuth detector. The main control portion 161 may drive the two horizontal thrusters 181 and 182 such that the direction detected by the direction detector is kept constant while the AUV 110 is rotating with the holding device 131 holding the pole 143.

In Modified Example 1, the number of thrust generating apparatuses included in the charging station 140A and the arrangement of the thrust generating apparatus(es) are not limited to the above-described configurations. For example, the two horizontal thrusters 181 and 182 may be provided at respective front and rear portions of the base 142 or may be provided at both respective sides of the base 142 in the left-right direction. Further, for example, the charging station 140A may include one horizontal thruster or three or more horizontal thrusters as the thrust generating apparatus. Further, in addition to or instead of one or a plurality of horizontal thrusters configured to generate thrust in the left-right direction of the charging station 140A, the charging station 140A may include, as the thrust generating apparatus, one or a plurality of thrusters configured to generate thrust in the front-rear direction or upper-lower direction of the charging station 140A. For example, the two horizontal thrusters 181 and 182 may be arranged so as to be spaced apart from each other in the left-right direction of the charging station 140A and to generate thrust in the front-rear direction of the charging station 140A.

The configuration in which the charging station includes the thrust generating apparatus configured to maintain the posture of the charging station under water as in Modified Example 1 is effective to any docking system as long as the docking system is a system configured to make an AUV dock, under water, with a charging station suspended from a water floating body. For example, in the charging system of the present invention, the light receiver performs the positioning between the power receiving portion and the power supplying portion by the light emitted from the light emitter. However, the above configuration is effective to systems other than the charging system of the present invention.

Modified Example 2

Figure 17:
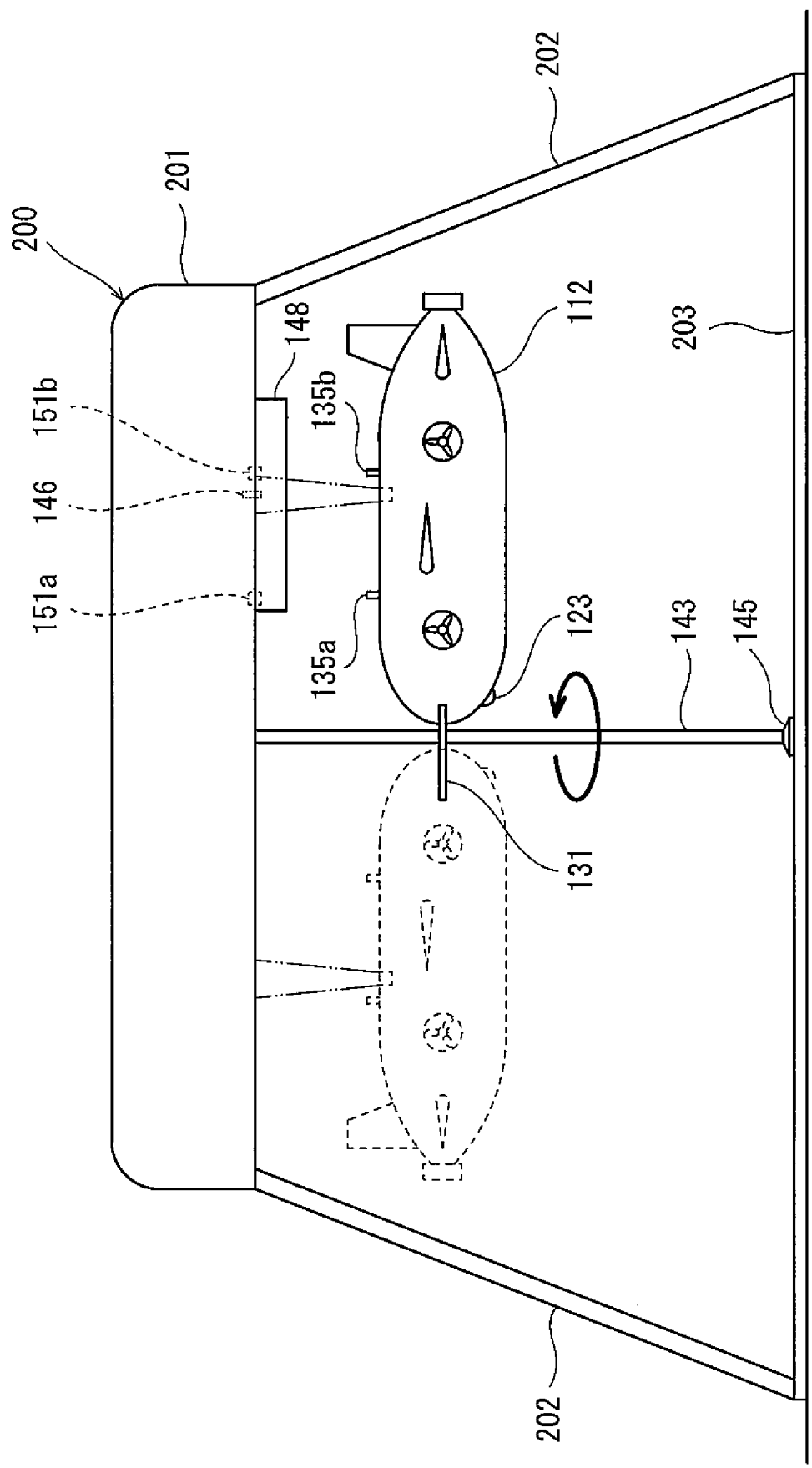
FIG. 17 is a side view of the charging station according to Modified Example 2.

FIG. 17 is a side view of a charging station 200 according to Modified Example 2. The charging station 200 according to Modified Example 2 is a bottom-of-water installation type charging station which is different in configuration from Embodiment 1.

Specifically, the charging station 200 includes an upper structure 201 and a plurality of posts 202. The upper structure 201 is arranged so as to be spaced apart from the bottom of water. The plurality of posts 202 extend in the upper-lower direction and support the upper structure 201 from below. The plurality of posts 202 are coupled to a lower structure 203 fixed to the bottom of water. A space surrounded by the upper structure 201, the lower structure 203, and the plurality of posts 202 is a space in which the AUV 110 enters through between the posts 202. At the middle of the space, the pole 143 extends downward from the upper structure 201. The power supplying portion 141 is provided at a position that is located at a lower portion of the upper structure 201 and is away from the pole 143 in the horizontal direction (rear direction). To be specific, the upper structure 201 corresponds to the "base" of the present invention, and the charging station 200 is the same in configuration as the charging station 140 of Embodiment 2 except that the upper structure 201 is not suspended from or supported by the water floating body. In Modified Example 2, the pole 143 extends downward from the upper structure 201. Therefore, for example, even when the charging station 200 is provided on a relatively shallow seabed, the pole 143 can be prevented from being hooked by a dragnet or the like.

Other Embodiments

It should be understood that the above embodiments are examples in all aspects and are not restrictive. The scope of the present invention is determined by not the above description but the scope of the claims and is intended to include all modifications within the meaning and scope equivalent to the scope of the claims.

For example, regarding the shapes of the charging stations 40, 140, 140A, and 200 and the AUVs 10 and 110 in the above embodiments and the shapes, arrangements, and the like of the components provided in the charging stations 40, 140, 140A, and 200 and the AUVs 10 and 110 in the above embodiments, the scope of the present invention is intended to include all modifications within the meaning and scope equivalent to the scope of the claims.

Further, in Embodiment 1, the charging station 40 is of a bottom-of-water installation type. However, the charging station 40 does not have to be provided on the bottom of water. For example, the charging station 40 may be suspended from and supported by the water floating body in such a manner that a cord hung from the water floating body is coupled to the upper end portion of the pole 43. Further, in Embodiment 2, the charging station 140 is suspended from and supported by the water floating body that sails on water. However, the water floating body from and by which the charging station 140 is suspended and supported may be a floating object such as a buoy or may be a structure located on water or under water. For example, the charging station of the present invention may be fixed to a structure located under water.

Further, in the above embodiments, as the thrust generating apparatus configured to move the underwater vehicle main body 12, the AUV 10 includes the main propulsion units 13, the vertical thrusters 14, and the horizontal thrusters 15. However, instead of some or all of the main propulsion units 13, the vertical thrusters 14, and the horizontal thrusters 15, the AUV 10 may include, as the thrust generating apparatus, a swing type thruster capable of changing a direction in which thrust is generated.

Further, the above embodiments adopt a noncontact-type power supply method by which power supply is performed without contact between the power supplying portion (41, 141) and the power receiving portion (11, 111). However, the above embodiments are not limited to this. The present invention may adopt a contact-type power supply method by which power supply is performed in a state where the power supplying portion (41, 141) and the power receiving portion (11, 111) contact each other. Further, in a case where the power supplying portion (41, 141) and the power receiving portion (11, 111) are adequately close to each other when the AUV (10, 110) has reached a predetermined rotational position relative to the pole (43, 143) after the holding device (31, 131) has held the pole (43, 143), electric power supply from the power supplying portion (41, 141) to the power receiving portion (11, 111) may be performed without moving the AUV (10, 110) along the pole (43, 143).

The positioning between the power receiving portion (11, 111) and the power supplying portion (41, 141) is performed based on whether or not the station-side optical receiver (46, 146) receives the light emitted from the underwater vehicle-side optical transmitter (22, 122). However, the underwater vehicle-side optical transmitter (22, 122) may be a mere light emitter which does not transmit signals, and the station-side optical receiver (46, 146) may be a mere light receiver which does not receive signals. Even in this case, the positioning between the power receiving portion (11, 111) and the power supplying portion (41, 141) can be performed based on whether or not the light receiver of the charging station receives the light emitted from the light emitter of the AUV.

Instead of the optical receiver, an optical transmitter or a light emitter may be provided at the position of the station-side optical receiver (46, 146), and instead of the optical transmitter, an optical receiver or a light receiver may be provided at the position of the underwater vehicle-side optical transmitter (22, 122).

The direction detector configured to detect the coming direction of the light from the charging station (40, 140) does not have to be the underwater vehicle-side optical receiver (23, 123). For example, the AUV may include an image pickup apparatus. The control device (16, 116) may detect the coming direction of the light from the charging station (40, 140) by specifying a light source position (station-side optical transmitter (45, 145)) from an image taken by the image pickup apparatus.

When the rotational position of the AUV (10, 110) relative to the pole (43, 143) can be adequately determined with a high degree of accuracy only by the positioning between the station-side optical receiver (46, 146) and the underwater vehicle-side optical transmitter (22, 122), one or both of the rotation restricting portion (48, 148) and the guide surface (53) of the locking device (51, 151) do not have to be provided at the base (42, 142).

Further, in the above embodiments, the charging station includes the locking device, and the AUV includes the locked portion locked by the locking device. However, the AUV may include the locking device, and the charging station may include the locked portion locked by the locking device. Further, in the above embodiments, the locked portion is the locked pin extending from the underwater vehicle main body 12, and the locking device includes a hole in which the locked pin is fitted. However, the configurations of the locked portion and the locking device are not limited to these. For example, the locked portion may be holes formed at respective left and right side portions of the underwater vehicle main body, and the charging station may include a locking device having hooks that can engage with the respective holes.

REFERENCE SIGNS LIST 1, 1A charging system
10, 110 AUV
11, 111 power receiving portion
12, 112 underwater vehicle main body
14 vertical thruster
15, 115 horizontal thruster
16, 116 control device
22, 122 underwater vehicle-side optical transmitter (light emitter)
23, 123 underwater vehicle-side optical receiver
31, 131 holding device
32a, 32b guide portion
33a, 33b holding claw
35, 135a, 135b locked pin (locked portion)
40, 140, 140A, 200 charging station
41, 141 power supplying portion
42, 142 base
43, 143 pole
45, 145 station-side optical transmitter
46, 146 station-side optical receiver (light receiver)
48, 148 rotation restricting portion
51, 151a, 151b locking device
52 fitting hole
53 guide surface
54a, 54b locking claw
61, 161 main control portion
62, 162 power supply control portion
170 water floating body
171 load lifting facility
172 cord
173 coupling member
181, 182 horizontal thruster
P1 holding position
P2 locking position

The invention claimed is:

1. A charging system for an autonomous underwater vehicle, the charging system comprising:
  a charging station including
    a base located under water,
    a pole provided at the base and extending in an upper-lower direction, and
    a power supplying portion provided at a position that is located at the base and is away from the pole in a horizontal direction; and
  an autonomous underwater vehicle including:
    an underwater vehicle main body,
    a power receiving portion provided at the underwater vehicle main body and supplied with electric power from the power supplying portion,
    a holding device including a pair of guide portions and a holding portion, the pair of guide portions being configured such that an interval between the guide portions widens in a proceeding direction from the underwater vehicle main body, and the guide portions guide the pole to a holding position after the pole contacts the guide portions from a proceeding-direction side, the holding portion being configured to hold the pole at the holding position so as to be rotatable relative to the pole,
    a thrust generating apparatus configured to generate, in at least the horizontal direction, thrust which makes the underwater vehicle main body rotate about the pole with the holding device holding the pole, and
    a control device configured to control the thrust generating apparatus, wherein:
  one of a light emitter and a light receiver is provided at a position that is located at the base and is away from the pole in the horizontal direction;
  the other of the light emitter and the light receiver is provided at a position that is located at the underwater vehicle main body and is away from the holding position in the horizontal direction;
  when the underwater vehicle main body has reached a predetermined rotational position relative to the pole with the holding device holding the pole, the light receiver receives light emitted from the light emitter; and
  the control device controls the thrust generating apparatus, by using a determination result regarding whether or not the light receiver receives the light emitted from the light emitter, such that with the holding device holding the pole, the underwater vehicle main body reaches the predetermined rotational position where the light receiver receives the light emitted from the light emitter, the predetermined rotational position being set relative to the pole.

2. The charging system according to claim 1, wherein:
the light emitter is an underwater vehicle-side optical transmitter configured to emit the light as an optical signal;
the light receiver is a station-side optical receiver configured to receive the optical signal from the underwater vehicle-side optical transmitter;
the charging station includes a station-side optical transmitter configured to emit light as an optical signal; and
the autonomous underwater vehicle includes an underwater vehicle-side optical receiver configured to receive the optical signal from the station-side optical transmitter.

3. The charging system according to claim 2, wherein:
the thrust generating apparatus generates the thrust which makes the underwater vehicle main body move in the proceeding direction and the upper-lower direction;
the station-side optical transmitter is provided so as to emit the light radially about the pole as the optical signal;
the autonomous underwater vehicle includes a direction detector configured to detect a coming direction of the light emitted from the station-side optical transmitter; and
the control device controls the thrust generating apparatus based on the coming direction detected by the direction detector such that the autonomous underwater vehicle proceeds, and the guide portions contact the pole.

4. The charging system according to claim 1, further comprising a water floating body floating on water, wherein:
the charging station is suspended under water by a cord extending from the water floating body; and
the pole extends downward from the base.

5. The charging system according to claim 1, wherein:
one of the autonomous underwater vehicle and the charging station includes a locking device;
the other of the autonomous underwater vehicle and the charging station includes a locked portion locked by the locking device; and
in a state where the locking device locks the locked portion, and the power receiving portion is arranged at such a position as to be supplied with electric power from the power supplying portion, the autonomous underwater vehicle docks with the charging station.

6. The charging system according to claim 5, wherein:
the thrust generating apparatus generates the thrust which makes the underwater vehicle main body move along the pole with the holding device holding the pole; and
when the underwater vehicle main body located at the predetermined rotational position moves along the pole such that the power supplying portion and the power receiving portion approach each other, the locked portion is arranged at such a locking position as to be locked by the locking device.

7. The charging system according to claim 6, wherein:
the locked portion is a locked pin extending upward or downward from the underwater vehicle main body;
the charging station includes the locking device; and
the locking device includes
a guide surface which is contacted by the locked pin and guides the locked pin to the locking position when the underwater vehicle main body moves along the pole such that the power supplying portion and the power receiving portion approach each other, and
a locking portion configured to lock the locked pin guided to the locking position.

8. The charging system according to claim 6, wherein the charging station includes a rotation restricting portion configured to, when the underwater vehicle main body is in the middle of moving along the pole, contact the underwater vehicle main body or the guide portion to mechanically restrict a rotation range of the underwater vehicle main body relative to the pole.

9. The charging system according to claim 5, further comprising a water floating body floating on water, wherein:
the charging station is suspended under water by a cord extending from the water floating body;
the pole extends downward from the base; and
the water floating body includes a load lifting facility configured to pull the cord to lift up in the air the charging station with which the autonomous underwater vehicle has docked.

10. The charging system according to claim 1, wherein the charging station includes a thrust generating apparatus configured to maintain at least one of a posture of the charging station under water and a direction of the charging station under water.

11. The charging system according to claim 1, wherein a distance from the pole at the base to one of the light emitter and the light receiver is equal to a distance from the holding position at the underwater vehicle main body to the other of the light emitter and the light receiver.

12. The charging system according to claim 1, wherein:
the predetermined rotational position is within a predetermined angular range about the pole; and
the charging system includes a light blocking portion which stands around the light receiver and blocks light coming from outside the predetermined angular range such that the light does not enter the light receiver.

* * * * *